US011853330B1

(12) United States Patent
Bannon et al.

(10) Patent No.: US 11,853,330 B1
(45) Date of Patent: Dec. 26, 2023

(54) DATA STRUCTURE NAVIGATOR

(71) Applicant: Splunk Inc., San Francisco, CA (US)

(72) Inventors: Ann Bannon, San Francisco, CA (US); Calvin Chan, Sunnyvale, CA (US); Nikhil Kasthurirangan, Palo Alto, CA (US); Park Kittipatkul, Foster City, CA (US); Kunal Mamidpalliwar, San Jose, CA (US); Alexandra Nuttbrown, Los Altos, CA (US); Eyal Ophir, Mountain View, CA (US); Caitlin Jessica Yolanda Pinn, San Francisco, CA (US); Rebecca Tortell, Redwood City, CA (US); Harsh Vashistha, San Jose, CA (US); Janet W. Yu, San Jose, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/863,657

(22) Filed: Apr. 30, 2020

(51) Int. Cl.
*G06F 16/28* (2019.01)
*G06F 3/0484* (2022.01)
*G06F 3/0482* (2013.01)

(52) U.S. Cl.
CPC .......... *G06F 16/287* (2019.01); *G06F 3/0482* (2013.01); *G06F 3/0484* (2013.01)

(58) Field of Classification Search
CPC ..... G06F 16/287; G06F 3/0482; G06F 3/0484
See application file for complete search history.

(56) References Cited

U.S. PATENT DOCUMENTS

| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 9,922,055 | B2 * | 3/2018 | Whitlock ................ G06F 16/21 |
| 10,127,258 | B2 | 11/2018 | Lamas et al. |
| 10,133,619 | B1 * | 11/2018 | Nagpal ............... G06F 11/0787 |

(Continued)

OTHER PUBLICATIONS

Splunk Enterprise 8.0.0 Overview, available online, retrieved May 20, 2020 from docs.splunk.com.

(Continued)

*Primary Examiner* — Jeremy L Stanley
(74) *Attorney, Agent, or Firm* — McDermott Will & Emery LLP

(57) ABSTRACT

According to embodiments, a method for navigating clusters of a data structure includes gathering data from the data structure by instrumenting instances of application software executing on the data structure. The method also includes identifying clusters of the data structure based on the gathered data. The method also includes causing display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers. The method also includes providing a status for each node, each pod, and each container of each cluster. The method also includes causing display of analysis of each cluster of the cluster map, the analysis comprising granular information for each cluster.

20 Claims, 20 Drawing Sheets

(56) References Cited

U.S. PATENT DOCUMENTS

| | | | |
|---|---|---|---|
| 10,191,778 B1* | 1/2019 | Yang | G06Q 30/0283 |
| 10,303,576 B1* | 5/2019 | Seymour | G06F 11/3433 |
| 10,489,215 B1* | 11/2019 | Wen | H04L 41/0896 |
| 10,547,521 B1* | 1/2020 | Roy | H04L 43/06 |
| 10,558,541 B1* | 2/2020 | Chakkassery Vidyadharan | G06F 11/3006 |
| 10,560,309 B1* | 2/2020 | Chitalia | H04L 41/069 |
| 10,673,714 B1* | 6/2020 | Chitalia | H04L 43/06 |
| 10,680,918 B1* | 6/2020 | Mazzitelli | G06F 9/547 |
| 10,728,121 B1* | 7/2020 | Chitalia | H04L 41/12 |
| 10,756,990 B1* | 8/2020 | Chakkassery Vidyadharan | G06F 11/3442 |
| 11,316,749 B1* | 4/2022 | Werner | G06T 11/206 |
| 2017/0111241 A1* | 4/2017 | Degioanni | H04L 41/5009 |
| 2018/0077044 A1* | 3/2018 | Turgut | H04L 43/14 |
| 2018/0287902 A1* | 10/2018 | Chitalia | G06F 11/327 |
| 2018/0288129 A1* | 10/2018 | Joshi | H04L 43/08 |
| 2019/0098106 A1 | 3/2019 | Mungel et al. | |
| 2019/0102226 A1* | 4/2019 | Caldato | G06F 8/60 |
| 2019/0306022 A1* | 10/2019 | Shimoga Manjunatha | H04L 47/122 |
| 2019/0340094 A1* | 11/2019 | Lu | G06F 11/3447 |
| 2019/0370142 A1* | 12/2019 | Jonnala | G06F 11/3051 |
| 2019/0379590 A1* | 12/2019 | Rimar | H04L 43/045 |
| 2019/0386891 A1* | 12/2019 | Chitalia | H04L 43/10 |
| 2020/0026446 A1* | 1/2020 | Jawahar | G06F 3/0607 |
| 2020/0034746 A1* | 1/2020 | Poitras | G06N 20/20 |
| 2020/0036596 A1* | 1/2020 | Panda | G06F 11/3433 |
| 2020/0136908 A1* | 4/2020 | Perez-Aradros Herce | H04L 43/065 |
| 2020/0151018 A1* | 5/2020 | Jha | G06F 9/5077 |
| 2020/0193017 A1* | 6/2020 | Bannister | G06F 9/546 |
| 2020/0225990 A1* | 7/2020 | Vaddi | G06F 9/45558 |
| 2020/0241903 A1* | 7/2020 | Wang | G06F 9/451 |
| 2020/0241930 A1* | 7/2020 | Garg | G06F 9/541 |
| 2020/0285505 A1* | 9/2020 | Bailey | G06F 9/45558 |
| 2020/0310658 A1* | 10/2020 | Singh | G06F 3/067 |
| 2020/0341881 A1* | 10/2020 | Sakthivel | G06F 11/0751 |
| 2020/0364086 A1* | 11/2020 | Gavali | G06F 11/0709 |
| 2021/0006637 A1* | 1/2021 | Hilber | H04L 67/2833 |
| 2021/0019196 A1* | 1/2021 | Geffin | G06F 9/5027 |
| 2021/0117249 A1* | 4/2021 | Doshi | G06F 9/522 |
| 2021/0126871 A1* | 4/2021 | Bonas | H04L 47/82 |
| 2021/0248023 A1* | 8/2021 | Brown | G06F 11/302 |
| 2021/0271349 A1* | 9/2021 | Shah | G06F 3/0483 |
| 2021/0303368 A1* | 9/2021 | Yu | G06F 9/5077 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

* cited by examiner

| | | |
|---|---|---|
| 402 — Timestamp | 11:23:07AM 12/10/2019 | |
| 404 — Value | 23 | |
| 406 — Metric | Num Transactions | } Dimension (Metric) |
| 408 — Customer | Acme | } Dimension |
| 410 — Service | Checkout | } Dimension |
| 412 — Host | host9 | } Dimension |

} MTS 420

| DASHBOARDS | TRACES | INFRASTRUCTURE | ALERTS | METRICS | INTEGRATIONS |

Infrastructure Service 1040
Kubernetes   Cluster Map   Node List   Workloads   Networking   Node Detail   Pod Detail   More...

Cluster [A ▾]   Node Name [gke-us2-agamemnon ✕]   Filter [   ] 1006

Node Properties — 1008
Name   gke-us2-agamemnon
ID   gke-us2-agamemnon-1-898e5243
Condition   Ready
Taints   ok_with_this
  not_ok_with_that
Labels   coming_soon
Uptime   138min

1010

Workloads on this Node   [Search pods]   Group by [None ▾]

| Workload Name ▴ | Workload Type | Namespace | Number of Pods on this Node |
|---|---|---|---|
| ▲ data-sprinkler | deployment | Namespace 1 | 5 |
| data-sprinkler | deployment | Namespace 1 | 5 |
| data-sprinkler | deployment | Namespace 1 | 5 |
| data-sprinkler | deployment | Namespace 1 | 5 |
| data-sprinkler | deployment | Namespace 1 | 5 |

Tue 25 Jun 2019 05:26:10 PM

CPU% by Pod    Mem% by Pod    Network In by Pod    Network Out by Pod

Containers on this Node — 1012   [Search pods]   Group by [None ▾]

| Container Name ▴ | Pod Name | Workload Name | Namespace | CPU% of Node Capacity | Mem% of Node Capacity | Network in/sec | Network out/sec |
|---|---|---|---|---|---|---|---|
| container-1 | data-sprinkler-pod | data-sprinkler | Namespace 1 | 12% | 17% | 243 bits | 243 bits |
| container-1 | data-sprinkler-pod | data-sprinkler | Namespace 1 | 12% | 17% | 243 bits | 243 bits |
| container-1 | data-sprinkler-pod | data-sprinkler | Namespace 1 | 12% | 17% | 243 bits | 243 bits |
| container-1 | data-sprinkler-pod | data-sprinkler | Namespace 1 | 12% | 17% | 243 bits | 243 bits |
| container-1 | data-sprinkler-pod | data-sprinkler | Namespace 1 | 12% | 17% | 243 bits | 243 bits |

Tue 25 Jun 2019 05:26:10 PM

FIG. 10A

DATA STRUCTURE NAVIGATOR

TECHNICAL FIELD

The present disclosure generally relates to a data structure navigator, and more particularly to a data storage navigator for a container orchestrator.

BACKGROUND

Container orchestrators such as KUBERNETES are effective tools for achieving containerization of software applications. KUBERNETES provides developers flexibility, agility, and speed to re-factor their applications as they shift to microservices to leverage benefits of cloud-native technologies. However, operating a KUBERNETES environment at scale is difficult. The layers of abstractions and constant churn that KUBERNETES brings make it very difficult to maintain a high fidelity view of what is going on across clusters, identify problems as quickly as they occur, and understand the root causes without getting lost in a sea of data.

BRIEF SUMMARY

Embodiments of the present disclosure provide for navigating clusters of a data structure. According to embodiments, a method for navigating KUBERNETES clusters includes navigating through a cluster map to identify items of interest. For example, the items of interest may indicate potential causes of errors. The cluster map may be colored based on a health of each node for each cluster. A health of each pod for each node may also be indicated. Further, a health of each container for each pod may be indicated. Filtering may be applied based on the indicated health of each node, pod, or container to identify a specific instance that is causing the error. The specific instance may then be diagnosed to fix the error.

According to embodiments of the present disclosure, a computer-implemented method for navigating clusters of a data structure is provided. The method includes gathering data from the data structure by instrumenting instances of application software executing on the data structure. The method also includes identifying clusters of the data structure based on the gathered data. The method also includes causing display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers. The method also includes providing a status for each node, each pod, and each container of each cluster. The method also includes causing display of analysis of each cluster of the cluster map, the analysis comprising granular information for each cluster.

According to one embodiment of the present disclosure, a system for navigating clusters of a data structure is provided. The system may include at least one memory having instructions stored thereon. The system may also include at least one processor configured to execute the instructions, wherein at least one processor is configured to gather data from the data structure by instrumenting instances of application software executing on the data structure. The processor may further be configured to identify clusters of the data structure based on the gathered data. The processor may further be configured to cause display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers. The processor may further be configured to provide a status for each node, each pod, and each container of each cluster. The processor may further be configured to cause display of analysis of each cluster of the cluster map, the analysis comprising granular information for each cluster.

According to one embodiment of the present disclosure, non-transitory computer-readable storage medium comprising instructions stored thereon, which when executed by one or more processors, cause the one or more processors to perform operations for navigating clusters of a data structure. The operations may include gathering data from the data structure by instrumenting instances of application software executing on the data structure. The operations may also include identifying clusters of the data structure based on the gathered data. The operations may also include causing display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers. The operations may also include providing a status for each node, each pod, and each container of each cluster. The operations may also include causing display of analysis of each cluster of the cluster map, the analysis comprising granular information for each cluster.

According to one embodiment of the present disclosure, a system is provided that includes means for storing instructions, and means for executing the stored instructions that, when executed by the means, causes the means to perform a method for navigating clusters of a data structure. The method includes gathering data from the data structure by instrumenting instances of application software executing on the data structure. The method also includes identifying clusters of the data structure based on the gathered data. The method also includes causing display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers. The method also includes providing a status for each node, each pod, and each container of each cluster. The method also includes causing display of analysis of each cluster of the cluster map, the analysis comprising granular information for each cluster.

BRIEF DESCRIPTION OF THE DRAWINGS

The present disclosure is illustrated by way of example, and not limitation, in the figures of the accompanying drawings, in which like reference numerals indicate similar elements and in which:

FIG. 4 shows an example data structure, according to an embodiment of the present disclosure;

FIGS. 10A-10C illustrate additional exemplary user interfaces for navigating data structures of a container orchestrator, according to an embodiment of the present disclosure.

DETAILED DESCRIPTION

Figure 1:
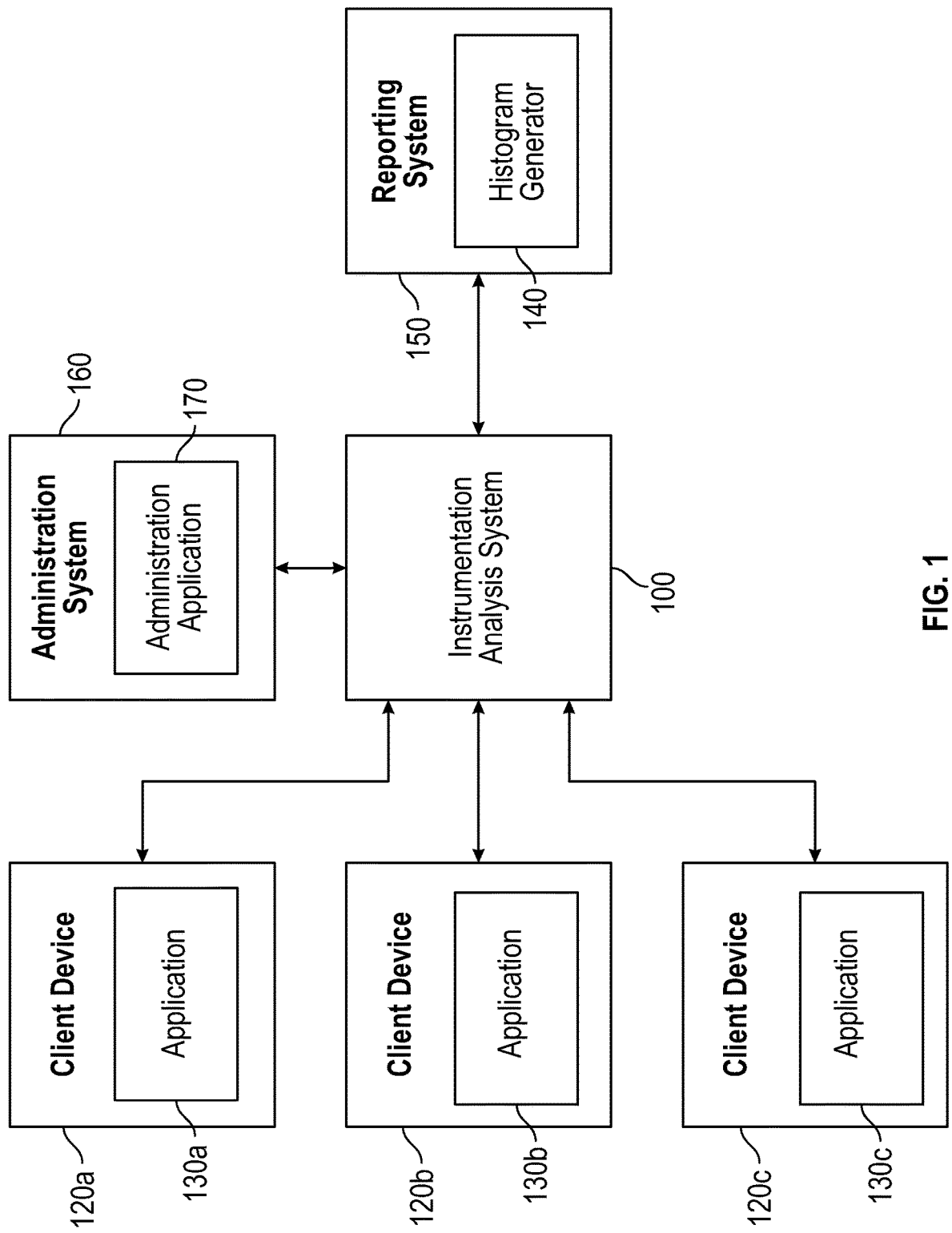
FIG. 1 shows an overall system environment for reporting based on instrumented software, according to an embodiment of the present disclosure.

Trace and Span Sampling and Analysis for Instrumented Software

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "trace" as used herein generally refers to a record of the manner in which a single user request, also referred to as a transaction, propagates from one microservice (hereinafter, interchangeably, referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. A trace, in one embodiment, may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags). The annotations and attributes can describe and contextualize the work being done under a span.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g. tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag, e.g. tag "region" may take different values in two services: a span in Service A may be attributed to "region:east" and a span in Service B attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more metadata objects (also referred to herein as "dimensions") results in a metric data point. A single metric data point may include multiple measurements and multiple dimensions. Metrics are used to track and assess the status of one or more processes. A metric typically comprises a numeric value that is stored as a timeseries.

Software developers monitor different aspects of software they develop by instrumenting the software. These aspects include performance of the software, disk utilization of the software, CPU utilization of the software, errors encountered during execution of the software, significant events encountered during execution of the software, information describing which parts of the code are being executed and which parts are not being executed, and so on. After development, similar aspects of the software are also monitored during production, for example, when software is being executed on a cloud architecture.

Conventional user environments are complicated because they include many micro transactions that are handled by a variety of hosts, containers, and infrastructure platforms. As a result, it is difficult to identify a root cause of an alert for a network problem, bad process, poor service, etc.

Computing operations can be described by spans and traces. A span may include an atomic computing operation performed in handling a request, and may include an operation name (e.g., "start"), a service (e.g., "analytics"), and start and end timestamps. Spans may be annotated with additional tags, such as key:value pairs, that provide further context regarding the execution environment. For example, a trace may include a set of spans traversed in the handing of a single request.

According to embodiments, each span and trace may have a duration equal to the difference between the start and end timestamps for the span, or for the group of spans forming the trace. Instrumented software may be instrumented to emit spans and traces. The spans and traces can be generated according to an industry standard, such as the OpenTracing standard. Each span may be annotated with one or more tags that provide context about the execution, such as the user instrumenting the software, a document involved in the request, an infrastructure element used in servicing a request, etc.

Communicating all of the spans and traces produced by a software application to an analysis system and storing these spans and traces imposes a serious infrastructure cost. Furthermore, it is unnecessary to transfer and store all emitted spans and traces, since code usually executes quickly and without errors. In prior implementations, traces emitted by a software application were randomly sampled and transmitted for analysis. However, certain types of traces provide more valuable information, and random sampling may not surface these traces. For example, if most traces are error-free, and only a few indicate errors, a random sampling scheme provides a large amount of uninteresting, error-free traces, and may miss the traces that indicate errors.

To obtain a sample of traces that includes a higher proportion of interesting traces, a gateway performs tail-based sampling of traces. The gateway resides at the instrumented software, receives all emitted spans and traces, and in real or near-real time, selects traces to transmit to an analysis system. For example, the gateway selects a portion of traces that include an interesting span (e.g., selecting for spans with long durations), a portion of traces that include a span with an error, and a portion of traces selected based on overall trace duration. The gateway may select spans and traces using a statistical model that references a reservoir of spans and traces. The gateway maintains in the reservoir a collection of duration values that describe the distributions of durations for recently received traces and recently received spans, and the span or trace distribution is used to calculate a score for each received span or trace. Each emitted trace has a chance of being selected, but the gateway favors selecting longer or unusual spans and traces. Each selected trace is associated with a weight indicating the likelihood that the trace is stored according to the statistical model.

The gateway may use a dynamic timeout mechanism to determine when a trace is complete. For example, the dynamic timeout mechanism may include both a fixed duration (e.g., 100 ms) and a variable duration that is calculated based on durations of other traces. If a trace reaches the larger of the fixed duration and the variable duration, it is considered complete and passed through the sampling mechanism in the gateway. The reservoir of recently received traces may be used to calculate the variable duration; for example, the variable duration may be five times the $99^{th}$ percentile duration for a trace or a curve based on duration. Both the fixed duration and the variable duration may be configurable. The dynamic timeout mechanism provides a balance between completeness/accuracy and timeliness. In addition, the dynamic timeout mechanism saves memory compared to using only a longer fixed duration, since in most cases, the sampling decision can be made sooner than if only a long fixed duration (e.g., 5 minutes) is used.

The analysis system receives the traces selected by the gateway and performs analysis on the selected traces. The analysis system may derive a distribution of all of the emitted spans and traces (not just the selected traces) based on the weights. The analysis system may receive traces, with their component spans and associated tags, from multiple instances of instrumented software.

In an embodiment, the analysis system compares durations of a set of similar spans (e.g., spans for the same type of request) with the tags associated with these spans and determines whether there are any patterns for a given tag. The analysis system generates a histogram that represents a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-values less than or equal to some threshold, e.g., 0.01.

In another embodiment, the analysis system uncovers patterns relating span tags to error spans, which are spans that cause an error or exception to be thrown. This can highlight possible explanations for errors and help users understand patterns among errors. For example, the analysis system can determine if error spans tend to come from a particular user (whose requests might be somehow malformed). To analyze errors, the analysis system computes, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analysis system may correct the p-value for the number of hypotheses tested, for example by multiplying the p-value by the total number of tags. This procedure defines a map from tags to non-negative real numbers. The analysis system sorts the tags by the associated p-value (in ascending order) and returns those with p-values less than or equal to some threshold, e.g., 0.01.

Architecture of a Metadata System in a Metrics Engine

FIG. 1 shows the overall system environment for reporting based on instrumented software, according to an embodiment. The overall system environment includes an instrumentation analysis system 100, one or more client devices 120, an administration system 160, and a reporting system 150. In other embodiments, more or less components than those indicated in FIG. 1 may be used. For example, client devices 120, administration system 160, and reporting system 150 may interact with instrumentation analysis system 100 via a network (not shown in FIG. 1). Furthermore, there may be more or less instances of each system shown in FIG. 1; for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g., "130" in the text refers to reference numerals "130a" and/or "130b" in the figures).

The instrumentation analysis system 100 receives data comprising values of metrics sent by different client devices 120 (e.g., the instrumentation analysis system 100 may also be referred to herein as an analysis system or a data analysis system). A client device 120 executes instrumented software, for example, application 130. Although, application 130 is shown in FIG. 1 as an example of instrumented software, the techniques disclosed herein are not limited to application software but are applicable to other kinds of software, for example, server software, software executing on customer devices, websites, and so on. Furthermore, a client device 120 may include any computing system that is configured to execute instrumented software, whether or not it is used for development of improved software. For example, the client device 120 may be a computing system used for testing purposes, staging purposes, or any production system executing in an enterprise.

The software executing on a client device 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. In an implementation, the application 130 may send data to the instrumentation analysis system 100 by invoking an application programming interface (API) supported by the instrumentation analysis system 100.

A gauge comprises instructions to measure certain runtime characteristics of the application 130, for example, heap size, number of cache misses or hits, active memory used, central processing unit (CPU) utilization, total time taken to respond to a request, time taken to connect to a service, and so on. A gauge may also be used to track certain application-specific parameters or business related values, for example, number of transactions, number of users, and so on. The gauge may be invoked periodically based on an interval that is configurable. The value of the gauge is sent to instrumentation analysis system 100 periodically.

A software program may be instrumented to generate spans with a common field in their data structures to designate spans that are part of a common trace. For example, the spans may include a trace identifier such that spans with the same trace identifier are a part of the same trace. A length of each trace may be determined by an administrator through the administration system 160.

The administration system 160 allows a privileged user, for example, a system administrator, to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify the application 130.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of the application 130.

Furthermore, the instrumentation analysis system 100 provides separation of the metadata describing the data streams from the data of the data streams. Accordingly, the amount of data that needs to be transmitted from the client devices 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be configured to generate a histogram to analyze generated spans and traces. In an implementation, the reporting system 150 may include a histogram generator 140 that interacts with the instrumentation analysis system 100 to generate a histogram.

The reporting system 150 can be a conventional computer system (e.g., a desktop or laptop computer), a tablet, or a device having computer functionality such as a personal digital assistant (PDA), a mobile telephone, a smart phone, or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage, and input/output controller. The computing system used for hosting the instrumentation analysis system 100 is typically a server-class system that uses powerful processors, large memory, and fast input/output systems compared to a typical computing system used, for example, as a reporting system 150.

In an embodiment, data from several client devices 120 may be consolidated, for example, by a server and the combined data sent to the instrumentation analysis system 100. For example, an enterprise may install a server that receives data streams internally from different client devices 120 and sends the combined data in a batch form to the instrumentation analysis system 100 periodically. This allows efficiency of external communication from the enterprise.

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are CPU load, cache misses, cache hits, and so on. A value of a dimension is also referred to as a coordinate value of the data stream. A coordinate value may be represented as a metadata attribute stored in a metadata store. Given the two dimensions of source and metric, a data stream may be identified by providing the two coordinates representing the source and the metric, for example, (server1, cpu_load) or (server2, memory_usage).

A data stream may be characterized by multiple dimensions more than the two dimensions (i.e., source and metric name) described above. For example, if each server has multiple CPUs, a dimension cpu_id may be included. Accordingly, each data stream obtained from a system may be characterized by (source_id, cpu_id, metric_name), i.e., a source identifier, a CPU identifier, and a name for the metric. Examples of data streams identified using three coordinates include (server1, cpu1, load), (server1, cpu2, load), (server2, cpu1, load), (server2, cpu2, load), and so on. According to embodiments, each data stream may include spans and traces.

As another example of a dimension, a system may define customer name as a dimension. The name of the customer may be reported by the instrumented software, for example, based on the configuration parameters of the instrumented software executing on a client device 120. The customer name may be specified for the instrumented software using a system property. The instrumented software includes the customer name when it identifies a data stream associated with that particular customer. The ability to associate a data stream with a customer allows the instrumentation analysis system to perform customer-specific analysis, for example, report on usages of systems for each customer, identify customers reporting more than a threshold number of errors, and so on.

A data stream may be obtained from instrumented software or may be generated as a result of execution of blocks of a data stream language program within the instrumentation analysis system 100. A data stream may also comprise data stored in the instrumentation analysis system 100, for example, in a data store, such as a time series data store 260, described herein.

Figure 2:
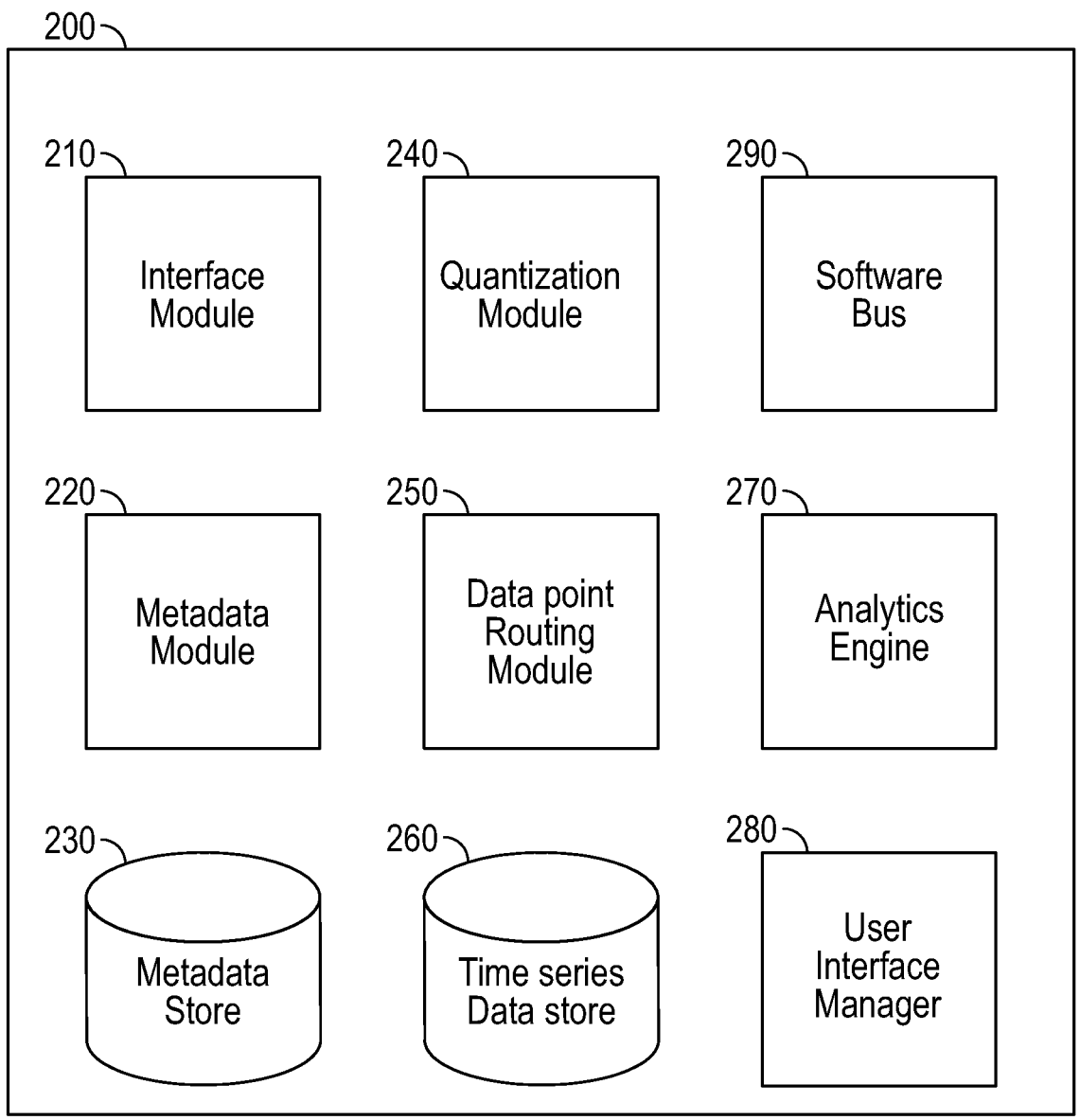
FIG. 2 shows an architecture of a system for processing data streams received from instrumented software, according to an embodiment of the present disclosure.

FIG. 2 shows an architecture of a system for processing data streams received from instrumented software, according to an embodiment. The instrumentation analysis system 200 includes an interface module 210, a quantization module 240, metadata module 220, metadata store 230, a data point routing module 250, an analytics engine 270, a user interface manager 280, a time series data store 260, and a software bus 290. In other embodiments, the instrumentation analysis system 200 may include other modules not described herein. Functionality indicated as provided by a particular module may be implemented by other modules instead.

The interface module 210 receives requests from external systems, for example, client devices 120 that communicate with the instrumentation analysis system 200. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams comprising spans and traces from one or more client devices 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, and one or more properties associated with the data.

In an embodiment, the timestamp associated with a tuple represents the time that the data value was received by the instrumentation analysis system 200. The properties associated with the data may be provided in the form of name-value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 200.

The metadata module 220 receives and stores metadata information describing various data streams received from the client devices 120. In an embodiment, the metadata stored in the metadata module 220 is received from a user, for example, a system administrator interacting with the instrumentation analysis system 200 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata store 230 stores the metadata objects and their associations with the data streams. The metadata store 230 stores an identifier (ID) for each metadata object and the properties represented by the metadata object. In an embodiment, each data stream is associated with a time series identifier that uniquely identifies the data stream. The metadata store 230 stores an index that maps each metadata object to a set of time series identifier values. The metadata store 230 may receive instructions to modify a metadata object. For example, the metadata store 230 may receive instructions to modify, add, or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The time series data store 260 stores data received from various sources, for example, client devices 120. The time series data store 260 is also referred to herein as a time series database (or TSDB). In an embodiment, the time series data store 260 also stores the time series data after the data is quantized. The time series data store 260 may also store rollup data for each time series. The time series data store 260 also stores results of various analytics requests, for example, results of various reports requested by a user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 200 to provide data of data streams to other modules of the instrumentation analysis system 200. A data stream language program may send a data stream to the software bus 290. Other modules, for example, fetch modules, window modules, and so on, can read the data from the software bus 290 and perform further processing on the data. For example, a data stream output of a data stream language program published on the software bus 290 may be identified by a find block of another data stream language program executing as a job.

Architecture for Processing Input Data

Figure 3:
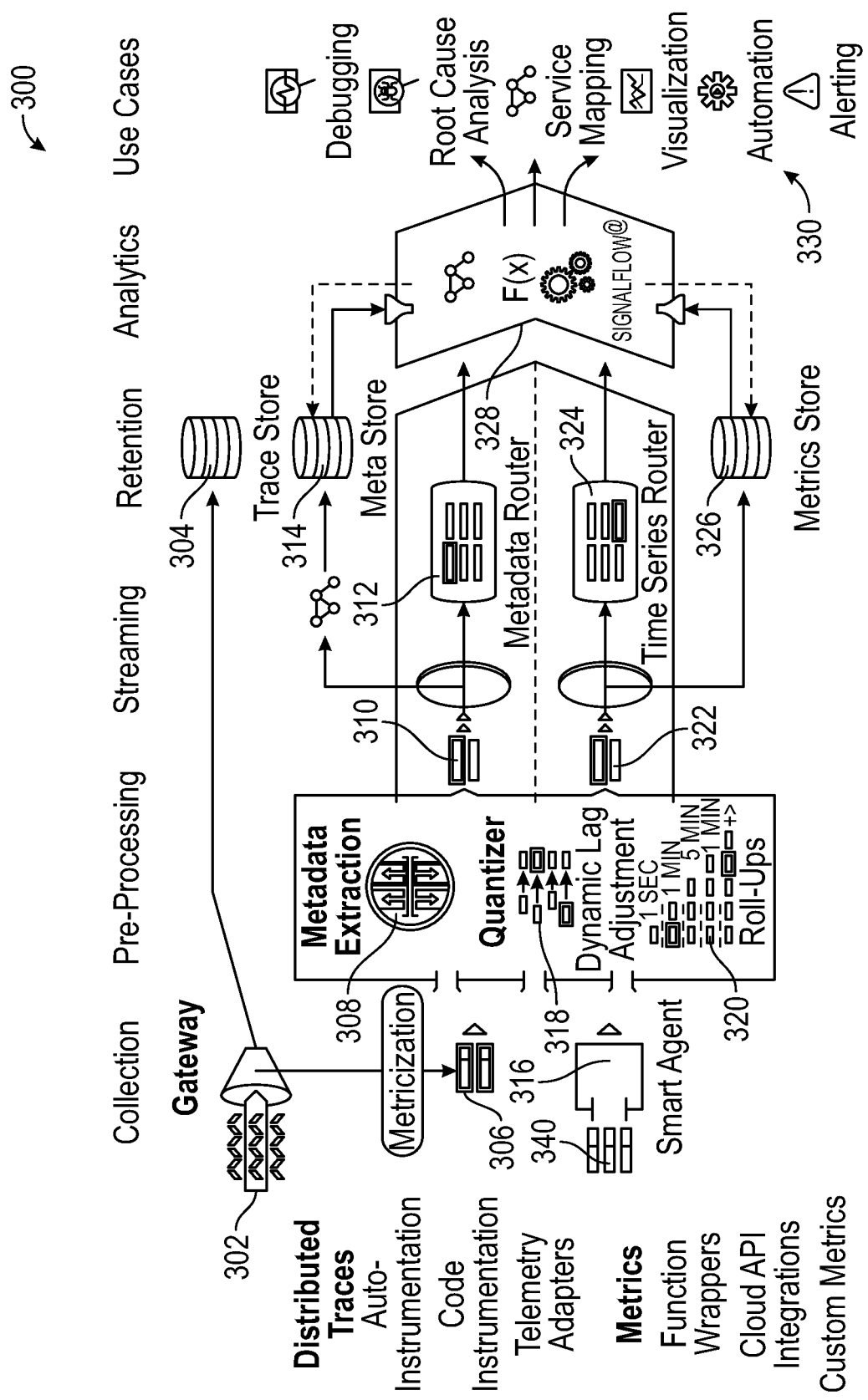
FIG. 3 shows an overall system architecture for processing input data, according to an embodiment of the present disclosure.

FIG. 3 shows an overall system architecture 300 for processing input data, according to an embodiment of the present disclosure. The architecture 300 may be configured to receive an input data stream 302. The input data stream 302 may include tail-sampled traces that are stored in a trace database 304. The input data stream 302 may also be metricized to generate metricized data 306. Metadata 310 may be extracted from the metricized data 306 through a metadata extractor 308.

According to embodiments, input data 340 may be processed by a smart agent 316 and quantized into metrics 322 to adjust for lag 318 based on roll-up periods 320. For example, the input data 340 may be received from cloud services (e.g., AMAZON WEB SERVICES, AZURE, GOOGLE CLOUD, etc.), open source software, language libraries (e.g., JAVA, PYTHON, GOLANG, etc.), operating systems, etc. In an implementation, the input data 340 may be processed based on a series of time windows (e.g., 1 sec, 1 min, 5 min, 1 hour, etc.). Multiple roll-ups including sum, count, min, max, lag, etc. may also be calculated.

According to embodiments, the metadata 310 may be processed separately from the metrics 322. For example, the metadata 310 may be stored in a metadata database 314 and also processed through a metadata router 312. The metrics 322 may be stored in a metric database 326 and processed through a time series router 324. The metadata 310 and metrics 322 may further be processed through a signal flow 328 as inputs to data science processes 330. For example, the data science processes 330 may include automatic outlier analysis, trace analysis, and incident analysis, among others.

FIG. 4 shows an example data structure 400, according to an embodiment of the present disclosure. For example, the data structure 400 may include a timestamp 402, a value 404, and a metric time series (MTS) object 420. The MTS object 420 may include multiple dimensions (e.g., metadata objects), such as a metric 406, a customer 408, a service 410, and a host 412. In implementations, the metric 406 may be a special case of a dimension. It is understood that an MTS object 420 may include at least one dimension, and as many as over 30 dimensions.

According to embodiments, the MTS object 420 may be identified by a unique combination of dimensions. For example, the illustrated MTS object 420 has four dimensions—one dimension each for a metric 406, a customer 408, a service 410, and a host 412. If dimensions were added, removed, or changed, the MTS object 420 would be recognized as a different MTS object from before.

According to embodiments, names and values may be extracted from the metadata. For example, the names may include tags such as "customer," "service," "host," etc. The values may include corresponding properties of the tags (e.g., keys), such as "num_transactions," "customer_name," "service_name," host_name," etc. The names may be linked with the values as name-value pairs, such that each dimension of an MTS object includes a name-value pair. For example, as illustrated in FIG. 4, "Customer-Acme," "Metric-Num_Transactions," "Service-Checkout," and "Host-host9" may be name-value pairs for each dimension of the MTS object 420. In this way, each MTS object 420 can point to multiple dimensions.

Figure 5:
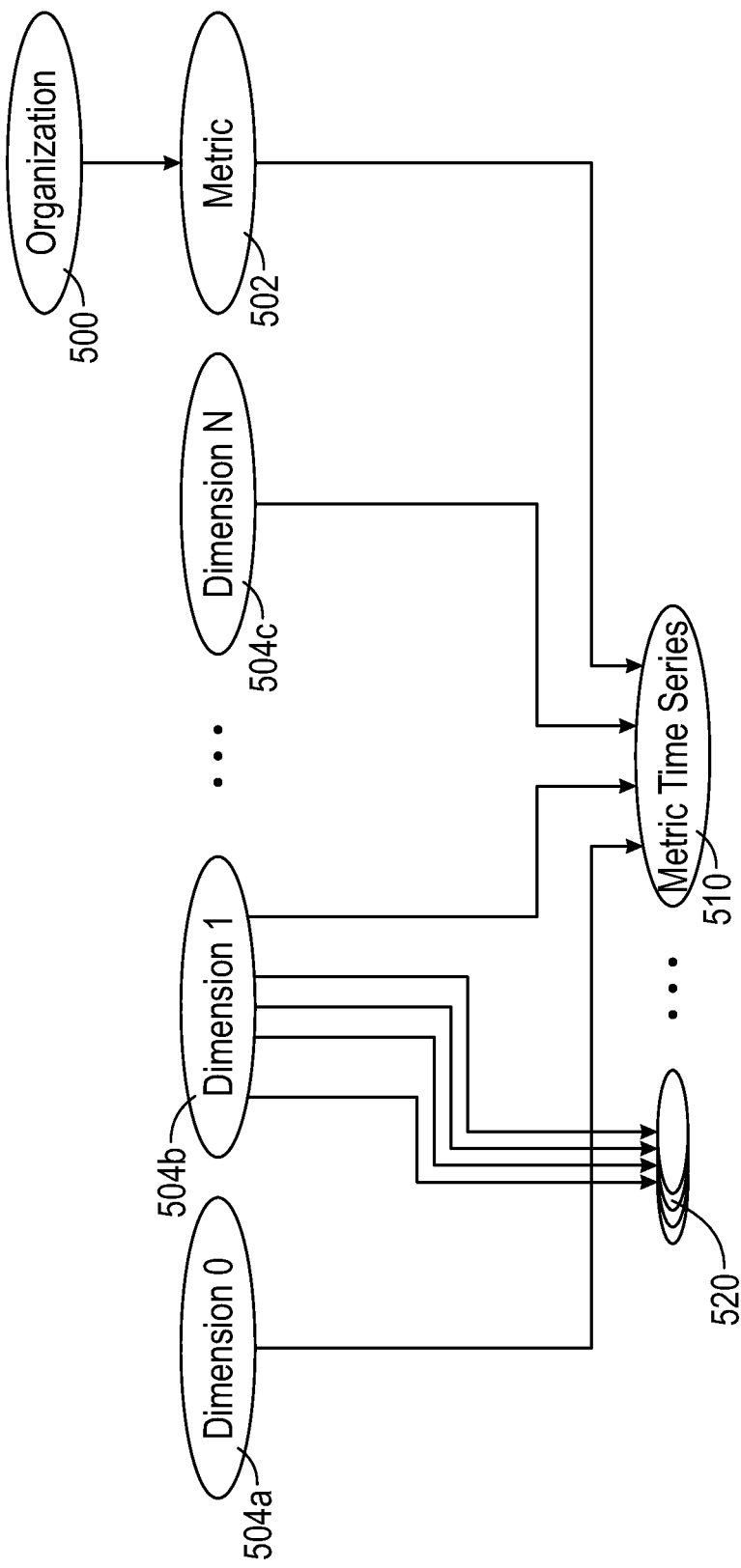
FIG. 5 shows an example of a conventional metric time series (MTS) object, according to an embodiment of the present disclosure.

FIG. 5 shows an example of a conventional metric time series (MTS) object 510. As illustrated, the MTS object 510 is de-normalized, which means that the MTS object 510 inherits all of the properties of dimensions 504a, 504b, 504c, metric 502, and organization 500. For example, the dimensions 504 may be for host, cluster, service, etc. The metric 502 is a special dimension with a fixed, well-known name. Each dimension 504 may have an immutable name and value, and a unique name-value combination (e.g., in the namespace of the tenant). Each dimension 504 may also optionally store additional mutable properties.

Conventionally, any change(s) to any of the properties of dimensions 504a, 504b, 504c, metric 502, and/or organization 500 would be copied down to the MTS object 510. Conventionally, the dimensions 504a, 504b, and 504c may also be linked to millions of other MTS objects 520. As a result, any change(s) to any of the properties of any of dimensions 504a, 504b, 504c, metric 502, and/or organization 500 would also be copied down to the millions of other MTS objects 520 as well. This is problematic because it is resource intensive and causes undesirable delays to the architecture 300.

Navigating Data Structures

Container orchestrators such as KUBERNETES are effective tools for achieving containerization of software applications. KUBERNETES provides developers flexibility, agility, and speed to re-factor their applications as they shift to microservices to leverage benefits of cloud-native technologies. However, operating a KUBERNETES environment at scale is difficult. The layers of abstractions and constant churn that KUBERNETES brings make it very difficult to maintain a high fidelity view of what is going on across clusters, identify problems as quickly as they occur, and understand the root causes without getting lost in a sea of data.

Conventional solutions are mostly based on time-series database (TSDB) architectures and cannot keep up with the scale and churn caused by container orchestrators, such as KUBERNETES, and are therefore severely constrained. For example, conventional solutions need to visualize all containers at once or are limited to supporting only a very small number of containers, rendering them ineffective for large-scale production deployments. In many cases containers may come and go completely undetected because analytics jobs become too slow. This results in inaccurate alerts and blind troubleshooting.

Another shortcoming is that current industry practices are based on running command line tools, such as "kubectl get pods" to retrieve simple status information and "kubectl describe pod" to fetch details about pods. Running commands in this manner is insecure, inefficient, and lacks the relevant context developers need to effectively troubleshoot and investigate errors. Navigating across multiple layers of abstraction quickly becomes a nightmare scenario.

Furthermore, conventional solutions create vulnerabilities. This is because, in enterprise environments, it is challenging to provide the right level of access and visibility to every user while also maintaining a secure system. On one hand, developers need visibility into their workloads so the platform team does not need to get involved in every bug fix. On the other hand, excessively permissive access is a vector for serious security threats. This is because traditional solutions do not approach the problem with developers in mind. As a result, traditional solutions lack administration capabilities to provide agile self-service consumption with centralized control and do not easily answer simple questions related to inventory, health, and usage that are impacted when multiple developers use the shared container infrastructure.

As described above, conventional solutions experience several shortcomings, including having poor visualizations, being slow at scale, being difficult to utilize, and creating vulnerabilities. Therefore, there is a need for a data structure navigator that overcomes these shortcomings.

According to aspects, a data structure navigator provides a solution that combines the power of the above-described instrumented software architecture with purpose-built visualizations and analytics that address critical operational use cases without needing any customization. This is achieved through pre-built dashboards that are natively aware of container objects and characteristics, which allow an operator to navigate across abstraction layers and maintain hierarchical context out of the box. This enables highly efficient exploration and investigation of issues. Furthermore, to make triaging and problem resolution even faster and more proactive, AI-driven analytics are included that automatically surface insights and recommendations for further investigation.

The disclosed data structure navigator includes several features, including automatic discovery and instant visualization of the inventory, health, and performance of container resources with dynamic cluster maps and pre-built dashboards. The data structure navigator also provides automatic insights and recommendations into potential infrastructure problems, real-time accurate alerts, and full-stack visibility that correlates service workloads to containers through tracing of instrumented software. As a result, the data structure navigator communicates accurate information and provides capabilities specifically to those that need it without providing direct access to clusters.

Advantages include expedited troubleshooting, faster time to value, reduction in mean time to clue, reduction in mean time to detection, expedited root cause analysis, maintaining a secure and enterprise-grade infrastructure, and centralized management with self-service access, among others.

Embodiments of the present disclosure provide for navigating clusters of a data structure. According to embodiments, a system for navigating KUBERNETES clusters includes at least one memory having instructions stored thereon. The system may also include at least one processor configured to execute the instructions, wherein at least one processor is configured to gather data from the data structure by instrumenting instances of application software executing on the data structure. The processor may further be configured to identify clusters of the data structure based on the data gathered. The processor may further be configured to cause display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers. The processor may further be configured to provide a status for each node, each pod, and each container of each cluster. The status may be indicative of the health of the respective node, pod, container, and/or cluster. The processor may further be configured to cause display of analysis of each cluster of the cluster map, the analysis comprising granular information for each cluster.

The disclosed system addresses a problem in traditional data structure navigation tied to computer technology, namely, the technical problem of navigating through clusters of a data structure. The disclosed system solves this technical problem by providing a solution also rooted in computer technology, namely, by providing for navigation through clusters of a data structure to identify errors. The disclosed subject technology further provides improvements to the functioning of the computer itself because it improves efficiency.

Figure 6A:
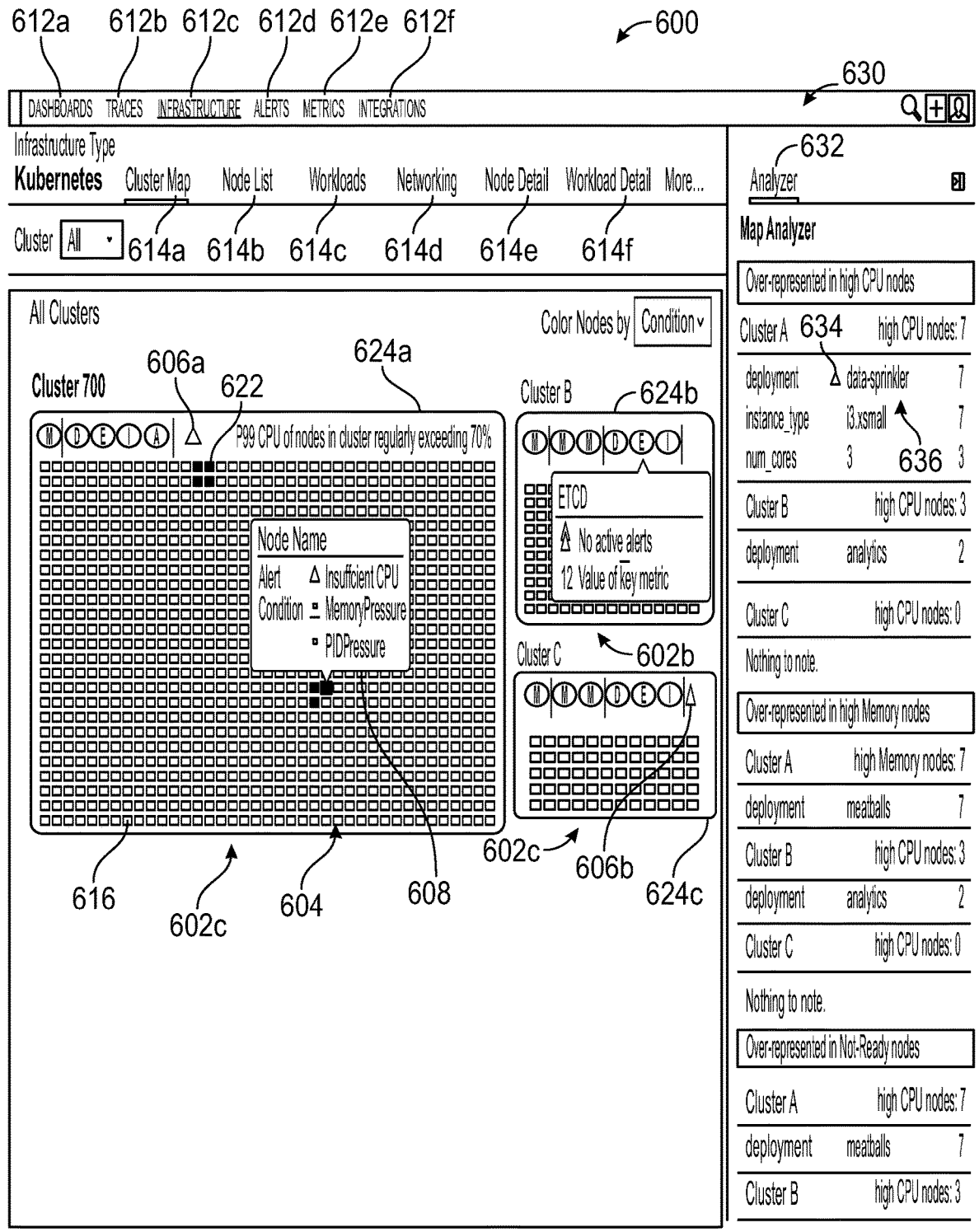
FIGS. 6A-6C illustrate exemplary user interfaces for navigating data structures of a container orchestrator at a cluster level of detail, according to an embodiment of the present disclosure.
Figure 6B:
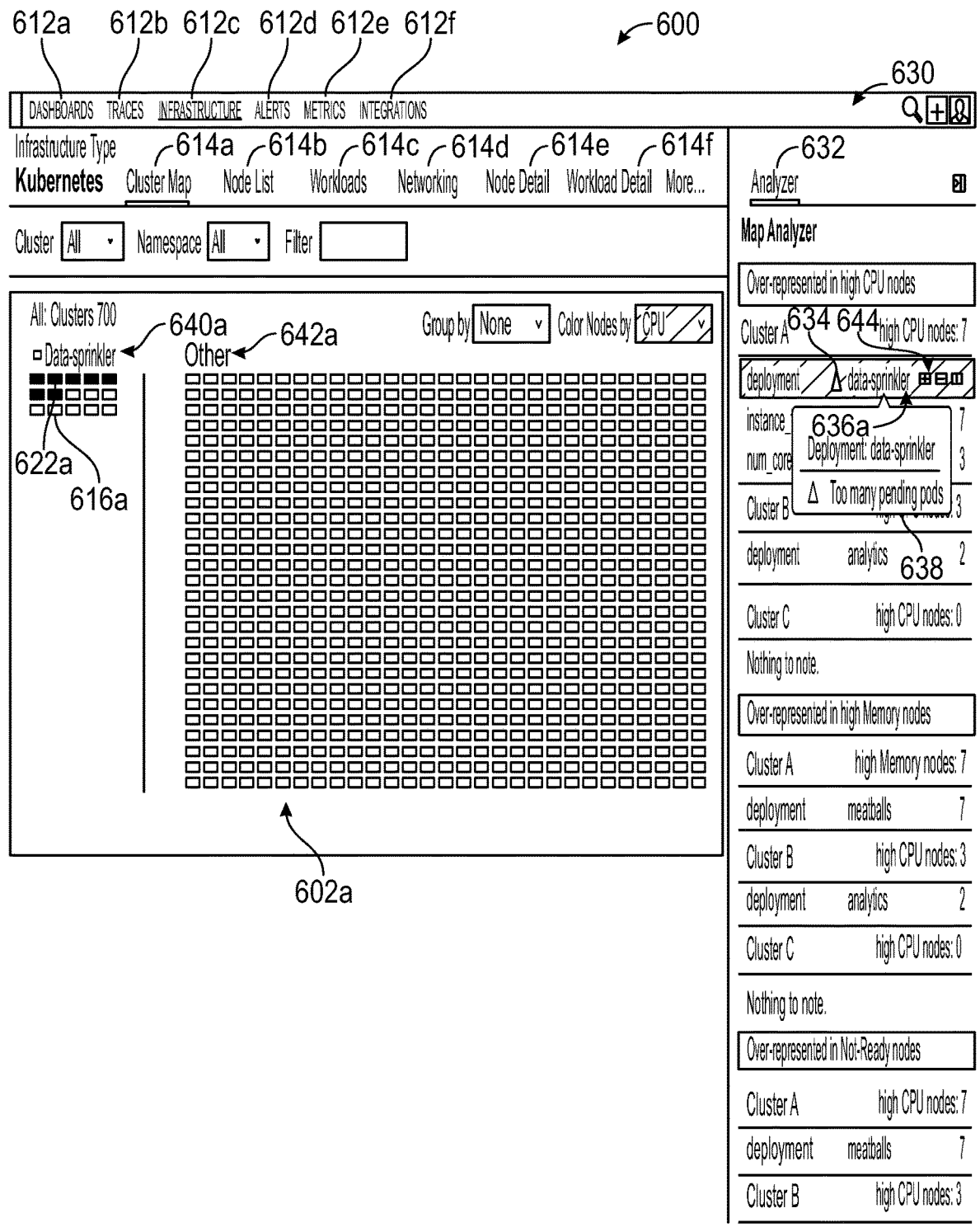
Figure 6C:
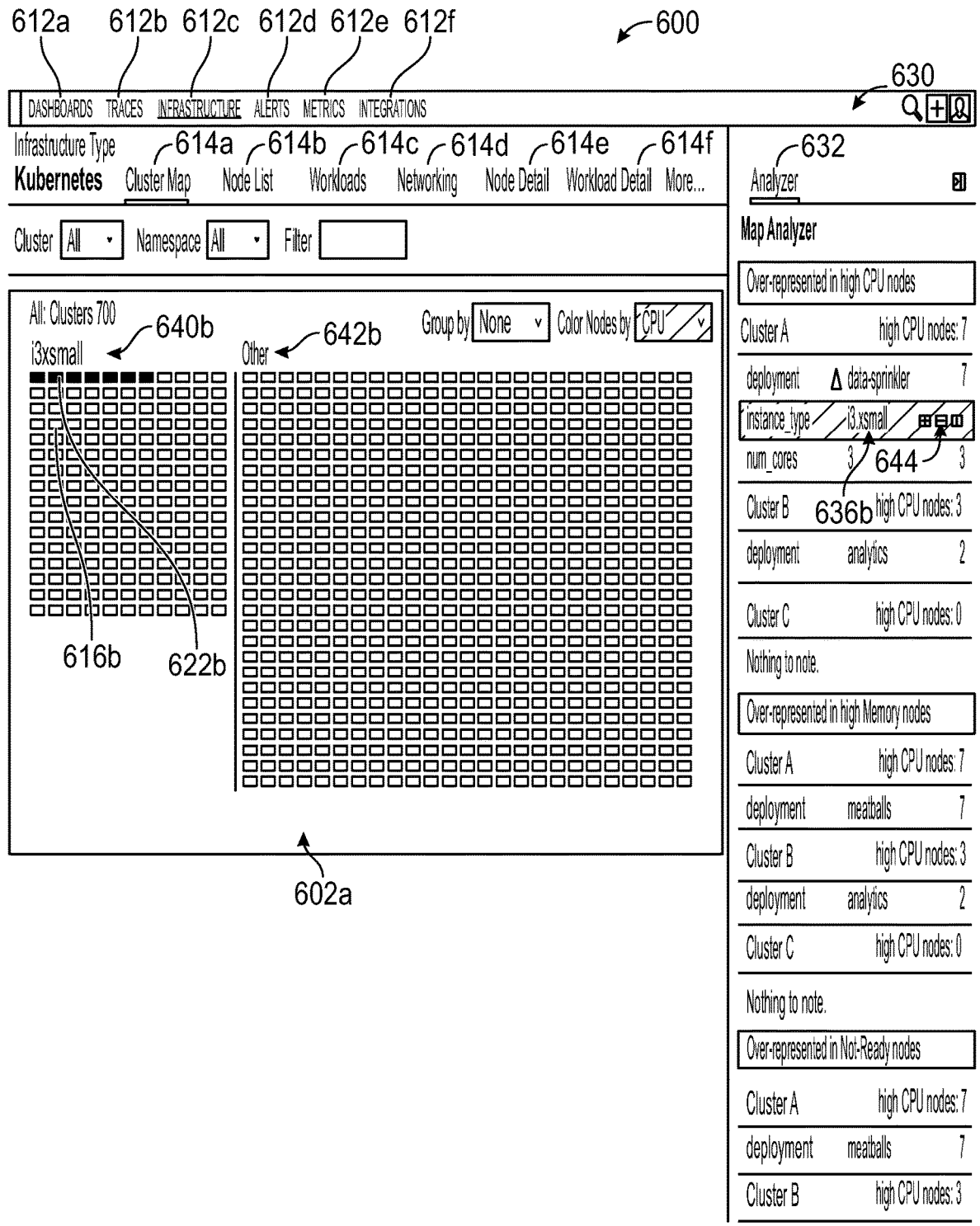
Figure 7A:
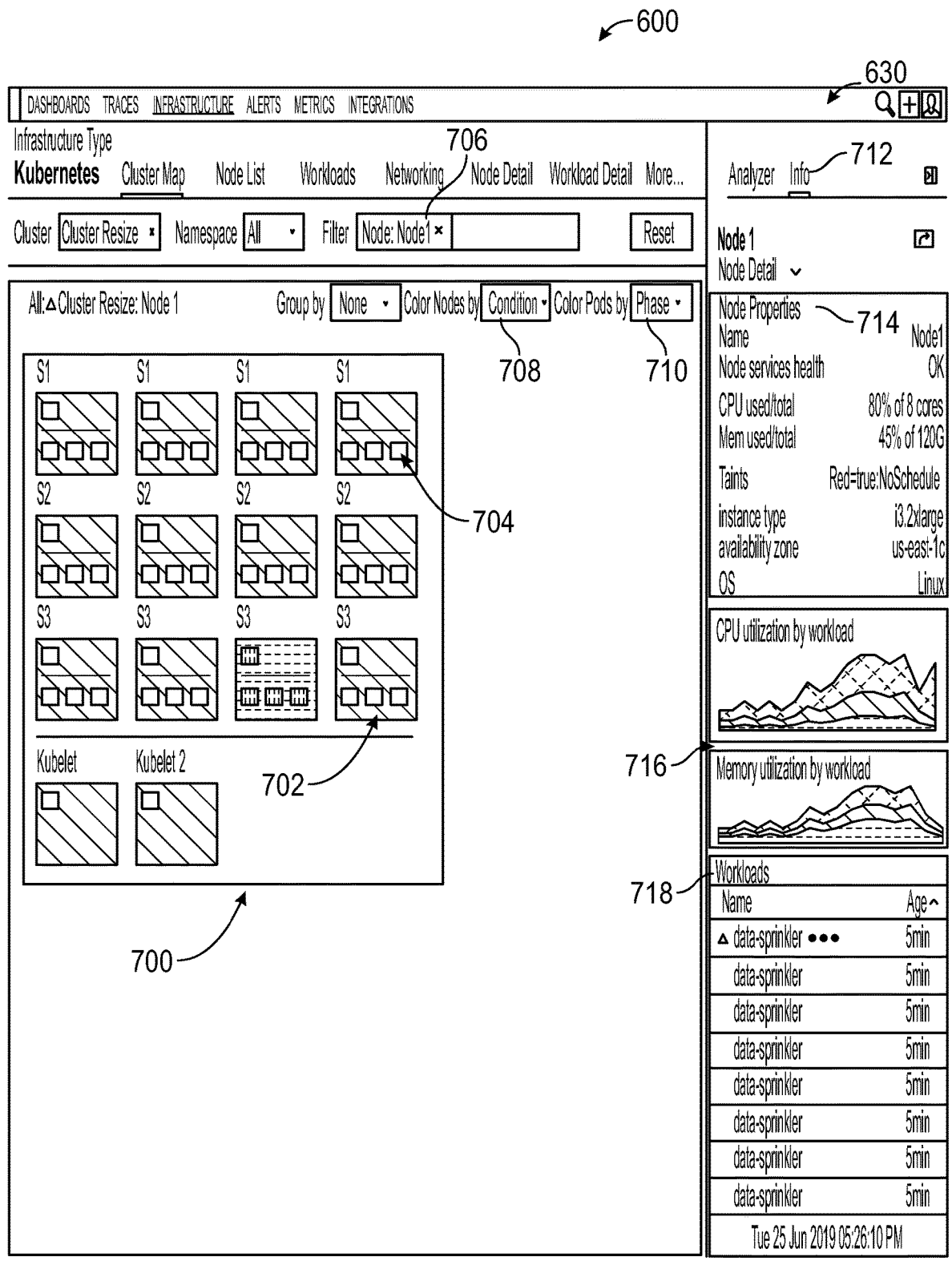
FIGS. 7A-7C illustrate exemplary user interfaces for navigating data structures of a container orchestrator at a node level of detail, according to an embodiment of the present disclosure.

FIGS. 6A-6C illustrate exemplary user interfaces 600 of a navigator for navigating data structures of a container orchestrator (e.g., KUBERNETES), according to an embodiment of the present disclosure. As illustrated, the user interface 600 is configured to provide auto-discovery and instant visualization of a status of each container data structure, including clusters 602, and nodes 604. For example, the user interface 600 may be generated based on information received from instrumented software and tracing of the instrumented software. As a result, the user interface 600 may automatically display the full hierarchy of objects and their associated metadata—clusters, nodes, pods, containers, and namespaces—as well as the workloads running in them. According to aspects, the hierarchy of objects and their associated metadata may be continuously streamed to the navigator so that the user interface 600 may dynamically produce interactive cluster maps 602, build detailed node and workload lists (as shown in FIG. 7A), and populate pre-built performance dashboards (as shown in FIG. 7A), among others.

According to aspects, the user interface 600 may include a navigation taskbar 610 that includes navigation tabs 612 for various functions, including, but not limited to, dashboards 612a, traces 612b, infrastructure 612c, alerts 612d, metrics 612e, and integrations 612f. As illustrated in FIG. 6A, the user interface 600 is displaying information related to the infrastructure tab 612. The user interface 600 may further include sub-tabs 614 for cluster map 614a, node list 614b, workloads 614c, networking 614d, node detail 614e, and workload detail 614f, among others. As illustrated in FIG. 6A, the user interface 600 is displaying information related to the cluster map 614a sub-tab.

As further illustrated in FIG. 6A, several clusters 602a, 602b, and 602c, each include multiple nodes 604. For example, each node 604 may correspond to a server of each cluster 602. According to aspects, a status 606 of each cluster 602 may be indicated by an outline 624 around each cluster 602. The status 606 may also include an alert 608. For example, cluster 602a may have a status 606 that indicates "P99 CPU of nodes in cluster regularly exceed 70%." The cluster 602a may also include an alert 608. The alert 608 may include a node name, alert information, and alert conditions. For example, as illustrated in FIG. 6A, cluster 602a has a status 606 that denotes there are errors within the cluster 602a. Nodes having errors/problems, e.g., unhealthy nodes 622, may be colored a different color than nodes without errors/problems, e.g., healthy nodes 616. For example, unhealthy nodes 622 may be colored orange or red, and healthy nodes 616 may be colored green. Similarly, the status 606 for each cluster 602 may be denoted by a color of each outline 624. For example, the status 606a for the cluster 602a may indicate an unhealthy status and may include an alert 608 showing that there is "Insufficient CPU" with conditions "MemoryPressure" and "PIDPressure." It is understood that the status 606 may be indicated with different colors or according to a different alerting convention, according to aspects. In contrast, cluster 602b and cluster 602c do not include alerts because these clusters are relatively healthy. Cluster 602c includes a status 606b that indicates the cluster 602c is not completely healthy, but also not unhealthy to the point that services are affected.

According to embodiments, a status of an unhealthy node 622 may be based on whether a threshold has been exceeded. For example, the threshold may be a number or percentage of nodes reporting an error. According to aspects, the unhealthy nodes 622 may be colored orange if the threshold (e.g., at least 50%) has been exceeded, but is less than a critical limit (e.g., 75% or more). If the critical limit is reached, then the unhealthy nodes 622 may be colored red. According to aspects, the color may indicate different types of errors and whether severe errors are present. For example, some errors may be categorized as more severe than others and their presence may automatically escalate the status to red over orange. According to additional aspects, the color may reflect how long an error has been present. For example, an error present for a threshold time period (e.g., an hour) may escalate the status from orange to red.

According to embodiments, a side panel 630 may be included with the user interface 600 that provides AI-driven insights and recommendations. For example, the side panel 630 may include functionality to analyze instrumented data in real-time to instantly surface erroneous conditions grouped by cluster and other metadata tags, such as "kubernetes_namespace" and "container_image." In this way, critical context is captured for correlating workloads and services running on infrastructure objects. With the benefits of real-time visibility, an interactive user experience, and AI-assisted troubleshooting, a user can effortlessly zoom in, filter, and explore complex containerized environments to quickly identify difficult-to-find problems.

As illustrated in FIGS. 6A, 6B and 6C, the side panel 630 includes an analyzer 632 that provides analysis of the cluster map 614a. For example, the analyzer 632 may leverage computer learning and/or statistical techniques to identify over-represented high CPU nodes, over-represented high memory nodes, and over-represented not-ready nodes, among others. As illustrated, Cluster A (e.g., cluster 602a) has seven high CPU nodes, Cluster B (e.g., cluster 602b) has three high CPU nodes, and Cluster C (e.g., cluster 602c) does not have any high CPU nodes. The analyzer 632 has further identified that deployment: "data-sprinkler" and instance-type: "i3.xsmall" each occur in seven high CPU nodes. According to aspects, "data-sprinkler" and "i3.xsmall" may be displayed as interactive links 636 (e.g., in blue font), such that additional information may be provided upon interacting with the interactive links. The side panel 630 may also include alerts 634 that provide information regarding possible causes of errors.

Referring to FIG. 6B, hovering over or otherwise toggling the interactive link 636 may cause additional information 638 to be displayed. For example, interacting with the interactive link 636a for deployment: "data-sprinkler" may cause the additional information 638 to be displayed. In this case, the additional information 638 relates to the alert 634 for "data-sprinkler," which states that there are "Too many pending pods."

According to an aspect, hovering over or otherwise toggling the interactive link 636a may cause the cluster map 614a to shift such that only the cluster(s) (e.g., cluster 602a) are displayed that include the deployment: "data-sprinkler." The cluster 602a may further be divided into nodes running deployment: "data-sprinkler" 640a and nodes not running deployment: "data-sprinkler" 642a. As illustrated, 15 total nodes are running the deployment: "data-sprinkler," with seven of them being unhealthy nodes 622a, and the rest being healthy nodes 616a. From this visualization, a user may decide to investigate these unhealthy nodes 622a further because deployment: "data-sprinkler" appears to be over-represented among the unhealthy nodes 622a.

In an implementation, the analyzer 632 may identify deployment: "data-sprinkler" as a potential source of errors by comparing nodes running deployment: "data-sprinkler" to nodes not running deployment: "data-sprinkler." For example, a threshold may be defined, such as whether a particular metric (e.g., CPU utilization) is over or under 70%. Nodes that are above 70% are compared to those that are below 70%. Metadata from nodes that are over-represented may then be utilized to identify a potential source of problems. In the instant case, deployment: "data-sprinkler" has been identified as being over-represented among unhealthy nodes rather than healthy nodes. A similar process may be utilized to identify other over-represented metrics and their associated root causes.

According to additional aspects, hovering over or otherwise toggling the interactive link 636a may cause display of options 644 to either filter, exclude, or compare based on the interactive link 636a. For example, visualization of the cluster(s) 602 may be adjusted to either filter, exclude, or compare based on the interactive link 636a.

Referring to FIG. 6C, a similar process may be utilized to identify nodes that are running instance-type: "i3.xsmall." As illustrated, hovering over or otherwise toggling the interactive link 636b may cause the cluster map 614a to shift such that only the cluster(s) (e.g., cluster 602a) are displayed that include the instance-type: "i3.xsmall." The cluster 602a may further be divided into nodes running instance-type: "i3.xsmall" 640b and nodes not running deployment: "data-sprinkler" 642b. As illustrated, 176 total nodes are running the instance-type: "i3.xsmall," with only seven of them being unhealthy nodes 622b, and the rest being healthy nodes 616b. From this visualization, a user may decide not to investigate these unhealthy nodes 622b further because instance-type: "i3.xsmall" does not appear to be over-represented among the unhealthy nodes 622b.

Figure 7B:
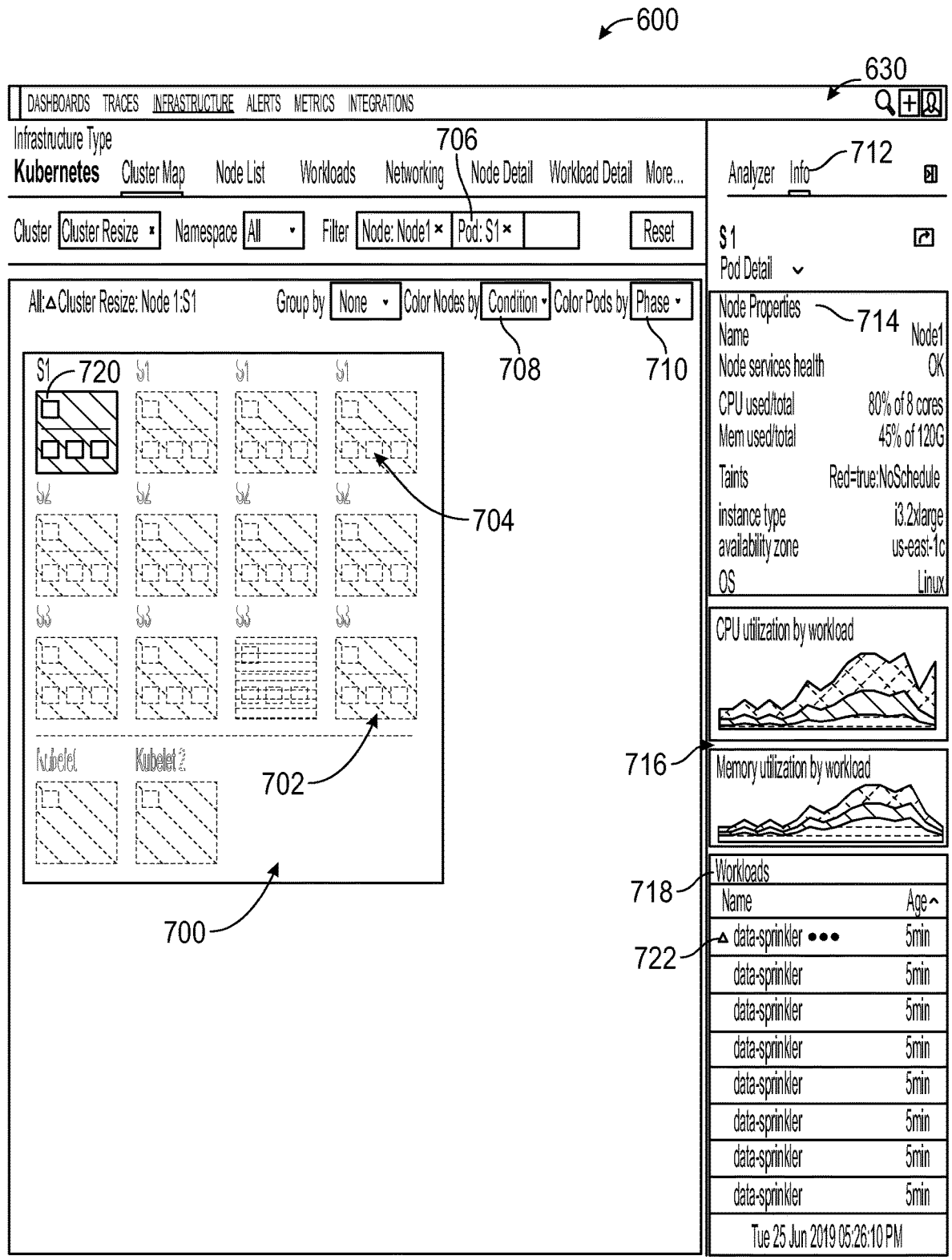
Figure 7C:
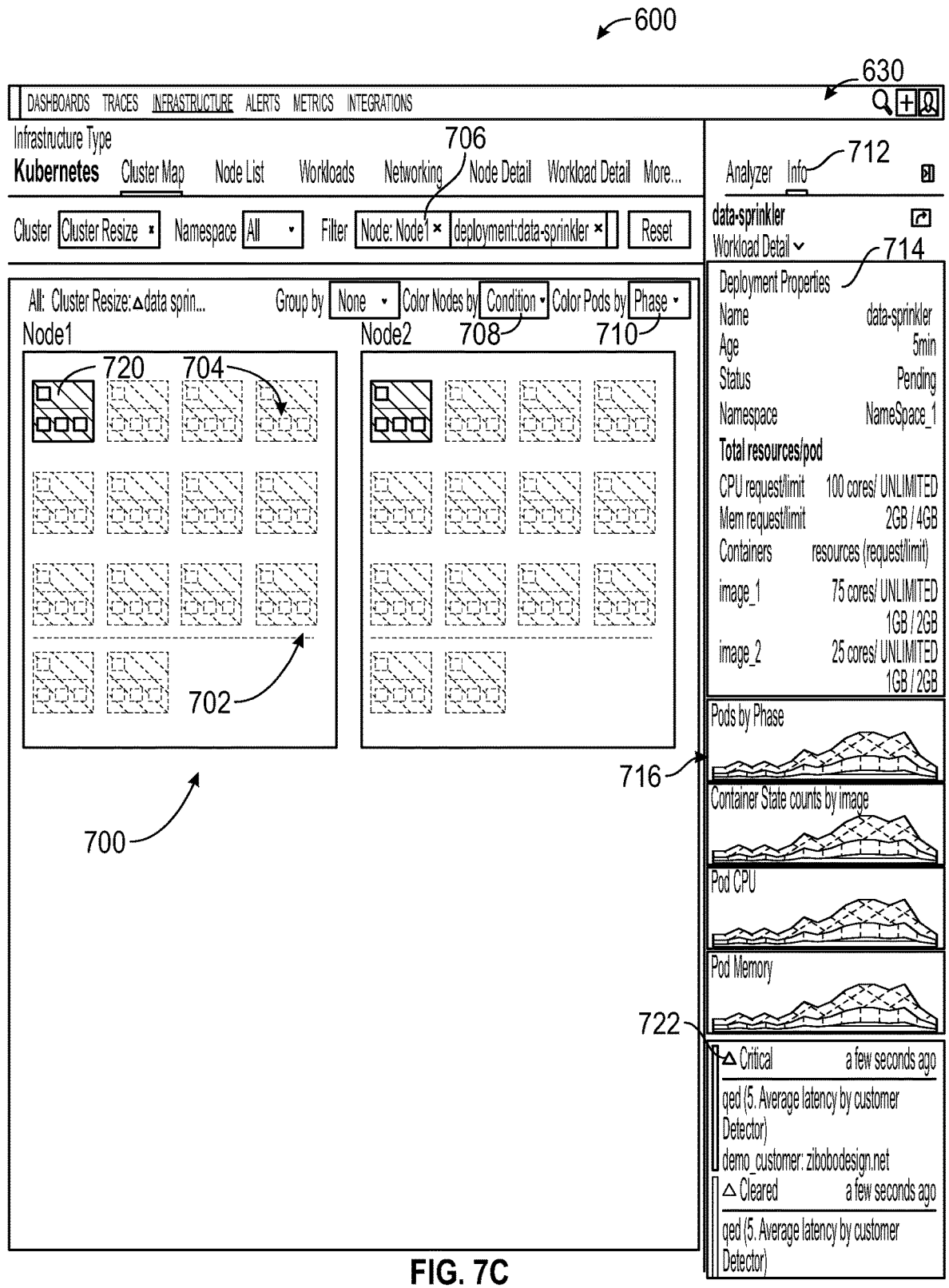

FIGS. 7A-7C illustrate exemplary user interfaces 600 for navigating data structures of a container orchestrator, according to an embodiment of the present disclosure. After identifying that a potential problem source is deployment: "data-sprinkler," as described above in FIGS. 6A-6C, further information may be visualized by selecting a node (e.g., node 700).

FIG. 7A illustrates a selected node 700 having multiple pods 702 and containers 704. For example, the containers 704 may be separated by main/sidecar status. According to aspects, selecting the node 700 may also automatically apply a filter 706 that filters out all other nodes. For example, only "Node1" (e.g., node 700) is shown after the filter 706 is applied. It is understood that various other filters 706 may be applied. For example, the filters 706 may be auto-generated, and may include instance_type, container_image, num_cores, operating system (OS), deployment, node_name, node_id, image_x, etc.

According to aspects, the node 700 may be colored based on a condition 708, and the pods 702 may be colored by a phase 710. It is understood that the node 700 and pods 702 may be colored based on other criteria as well.

According to an embodiment, the side panel 630 may display information 712 regarding the selected node 700. For example, the information 712 may include node properties 714, graphical information 716 (e.g., CPU utilization by workload, memory utilization by workload), and workloads 718.

According to aspects, the selected node 700 may be grouped 730 based on a variety of filters, including, but not limited to, node instance_type, node OS, node num_cores, pod workload, pod namespace, pod selector, pod application, etc.

Referring to FIG. 7B, a pod 720 may be selected, which may cause the other pods 702 to become dimmed. Selecting the pod 720 may also cause the filter 706 to automatically add an additional filter for the selected pod 720 (e.g., for PodS1). From here, a user may toggle the workloads 718 from the side panel 630 to view deployment details for an alert 722. For example, the alert 722 may be for deployment: "data-sprinkler."

Referring to FIG. 7C, toggling the workload 718 may cause the side panel 630 to display information 712 regarding deployment properties 724 for deployment: "data-sprinkler." As illustrated, this may also cause the filter 706 to automatically update to include deployment: "data-sprinkler." The side panel 630 may also update the graphical information 716 to show pods by phase, container state counts by image, pod CPU, and pod memory. Additional details regarding the alert 722 may also be displayed. For example, the user may notice that the alert 722 is critical. Furthermore, the deployment properties 724 are updated to show granular information regarding "data-sprinkler." Specifically, "data-sprinkler" been given unlimited resources, which is the likely culprit for causing the alert 722. Now that "data-sprinkler" has been isolated as a potential source of errors, the specific cause of the errors can now be identified as "data-sprinkler" having unlimited resources. The user may now contact an administrator of "data-sprinkler" to have this corrected (or the user may do this themselves, if they have access).

As illustrated above, the user interface 600 provides insights into possible sources of errors. By analyzing 632 and providing information 712, a user may drill down from a node view (as shown in FIGS. 6A-6C) to a pod view (as shown in FIGS. 7A-7C) to pinpoint a potential source of errors (e.g., "data-sprinkler"). It is also relevant to note that, at the pod level, there are no indications of errors based on pod conditions 708 or container phases 710. Rather, the errors occur at the node level (as shown in FIGS. 6A-6C). This demonstrates that, especially in a containerized environment, pinpointing sources of errors can be extremely difficult because they often occur at a granular level, such that the errors are not apparent until a higher level of execution (e.g., as illustrated in FIGS. 6A-6C) or from a neighboring deployment (e.g., a noisy neighbor). By providing granulized information at each level of the containerized data structure, errors may easily be diagnosed based on the container-to-service correlation. According to aspects, a computer may aid in diagnosing errors by causing display of alerts (e.g., alert 608), as described above in FIGS. 6A-6C.

With the knowledge of which workloads are running in specific containers, users are able to view, understand, and explore the relationship between various infrastructure objects and the services running on them. Accordingly, users may leverage various metadata, such as container ID, workload ID, service ID, etc. to correlate how the behavior of the infrastructure element is impacting service interactions and end user transactions, or vice versa. This is particularly helpful during troubleshooting when developers need to quickly pinpoint what service is causing sudden spikes in latency or error rate and why.

Figure 8A:
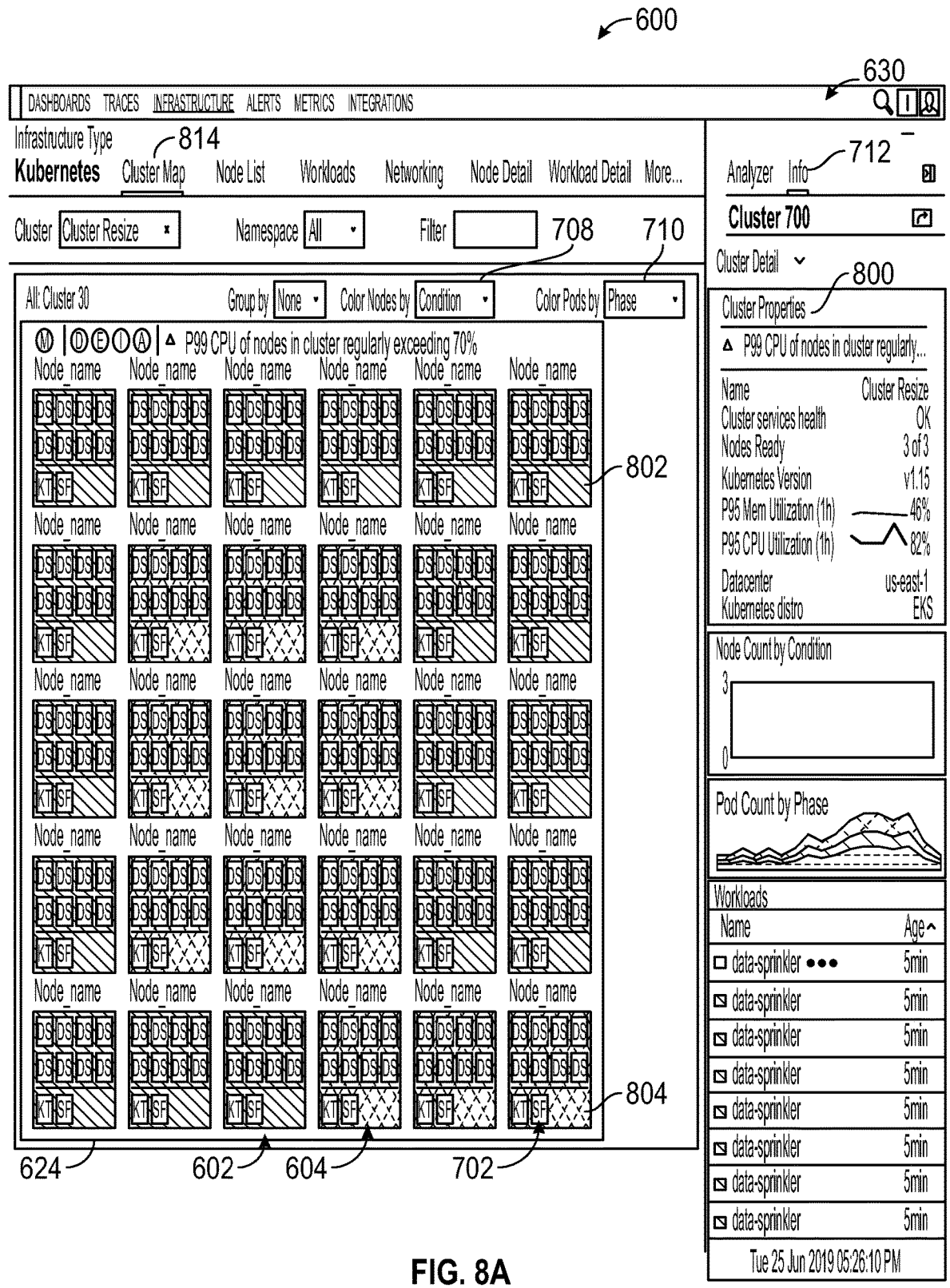
FIGS. 8A-8C illustrate exemplary user interfaces for navigating data structures of a container orchestrator at a container level of detail, according to an embodiment of the present disclosure.
Figure 8B:
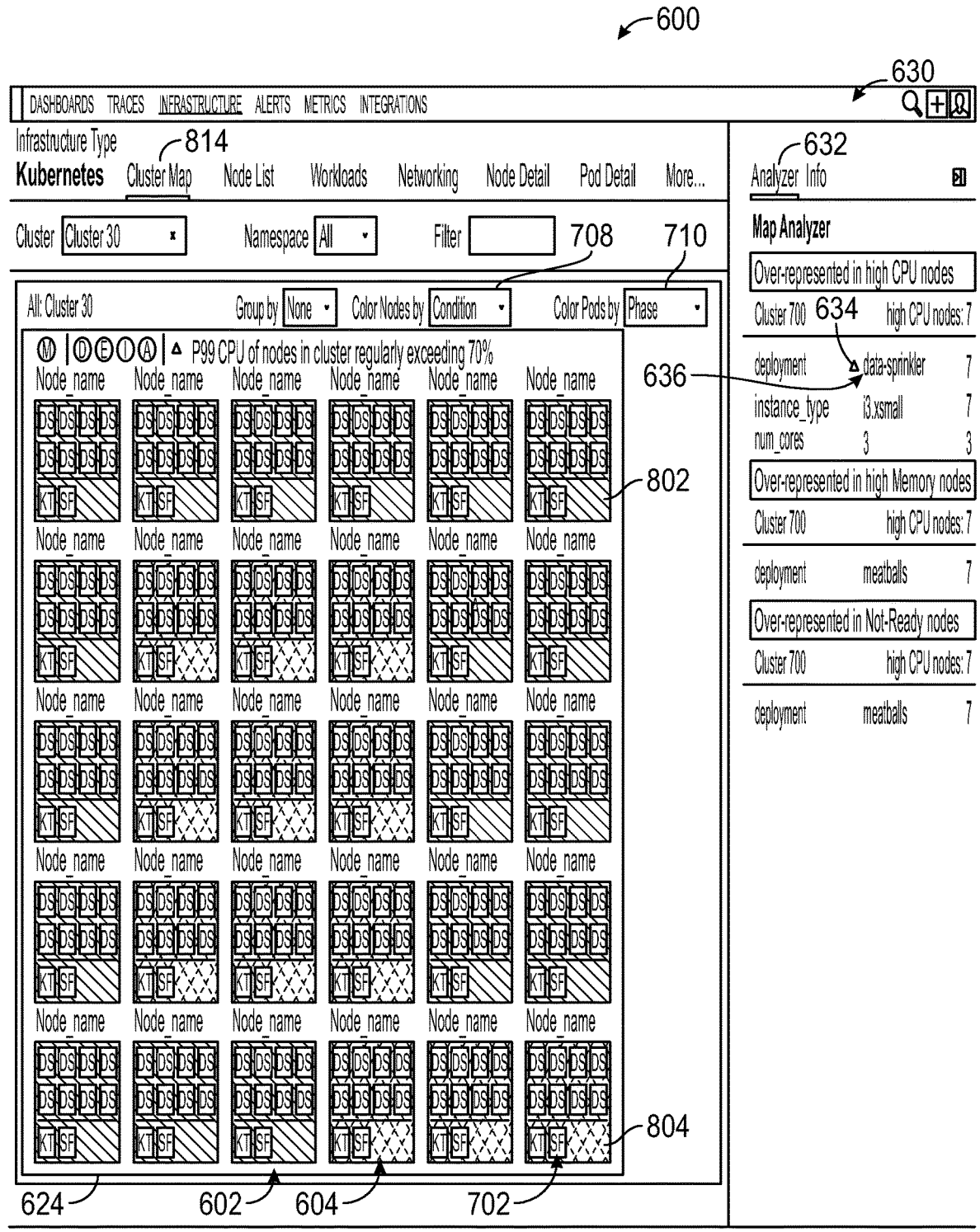
Figure 8C:
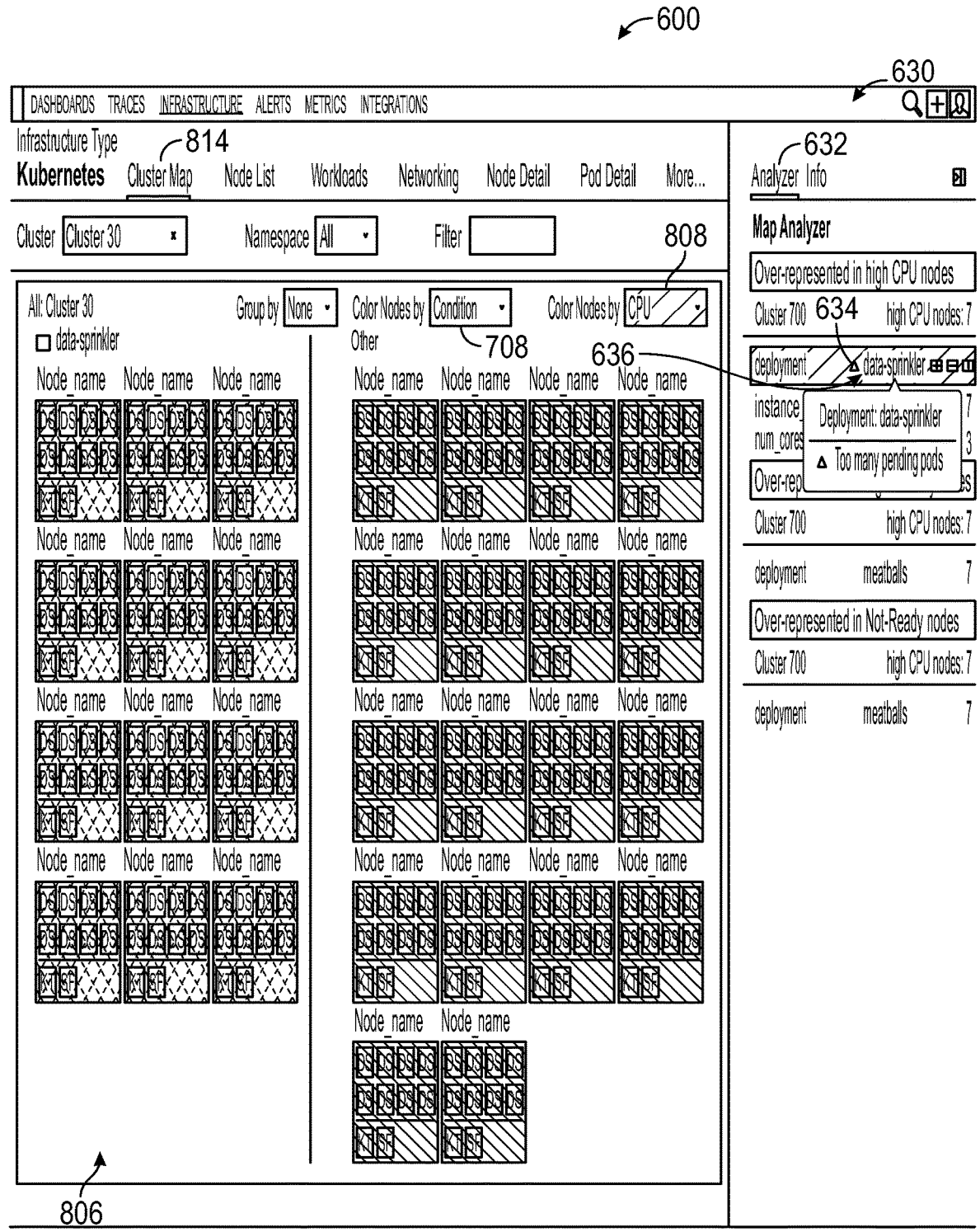

FIGS. 8A-8C illustrate exemplary user interfaces 600 for navigating data structures of a container orchestrator, according to an embodiment of the present disclosure. As shown in FIG. 8A, a cluster map 814 may display a cluster 602 including nodes 604 of the cluster 602, and pods 702 for each node 804. Information 712 from the side panel 630 may include cluster properties 800. For example, the nodes 604 may be colored by condition 708 and the pods may be colored by phase 710. For example, some nodes are ready 802, and some nodes are not ready 804. Furthermore, a status of the cluster 602 may be not ready, as denoted by the outline 624. As illustrated, the cluster map 814 may be configured to provide granularity to a pod level, along with all related metadata information.

Referring to FIG. 8B, selecting the analyzer 632 from the side panel 630 may display an analysis of the cluster map 814, similar to the above in FIGS. 6A-6C. For example, it may be determined through computer learning and/or statistical techniques that "data-sprinkler" is over-represented. Accordingly, an alert 634 and interactive link 636 may be provided for "data-sprinkler" to allow a user to access additional information. According to aspects, alerts 634 may be customized and configured by users (e.g., by custom KPIs or key attributes for a dimension value).

As illustrated in FIG. 8C, the cluster map 814 has been updated such that nodes over-represented in having high CPU are grouped together based on deployment: "data-sprinkler" 806. The nodes may also be colored based on CPU 808. From here, a user may navigate to details (e.g., information 712) regarding deployment: "data-sprinkler" to identify and fix errors based on the updated cluster map 814.

Figure 9A:
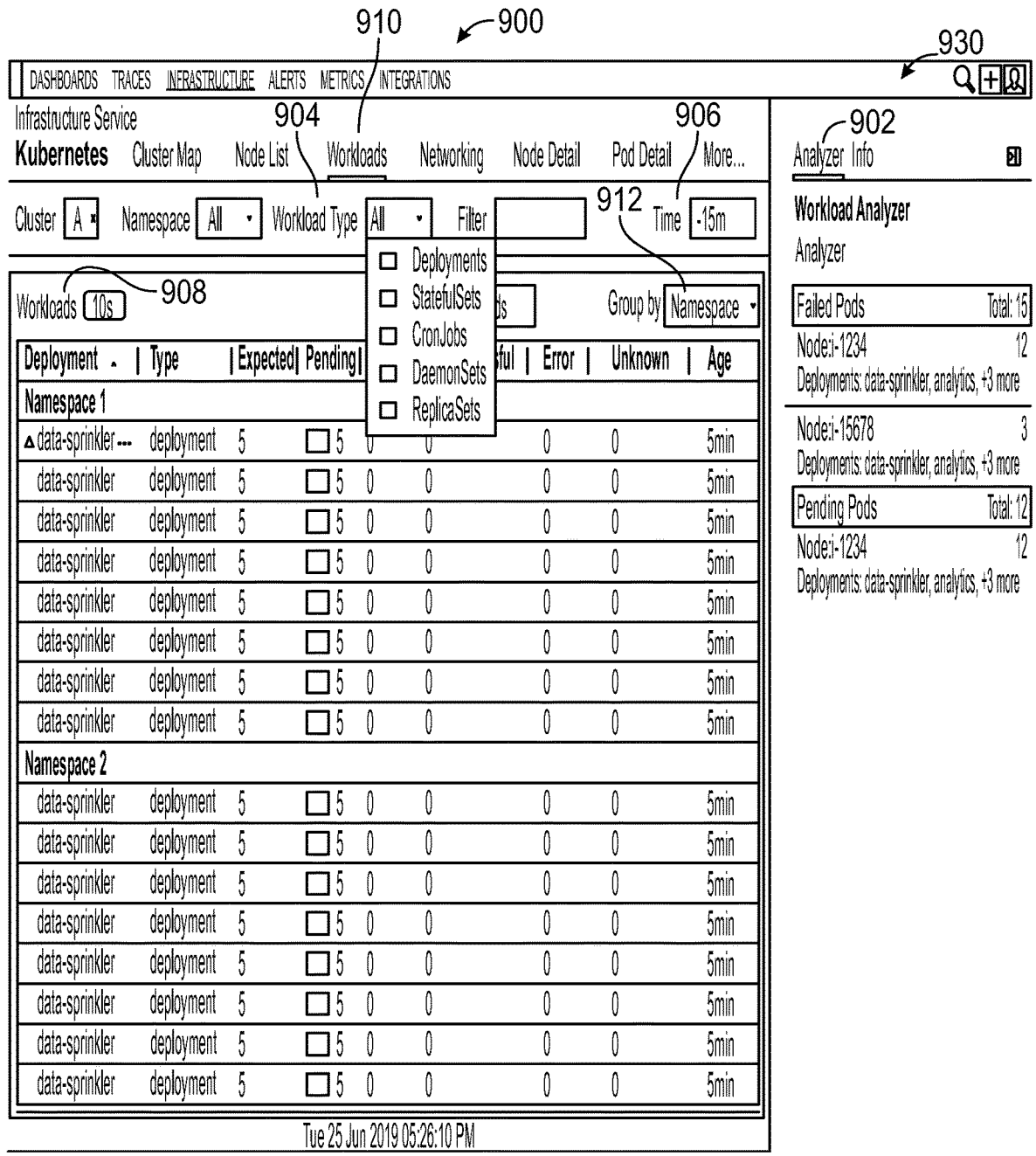
FIGS. 9A and 9B illustrate exemplary user interfaces for navigating data structures of a container orchestrator based on workloads, according to an embodiment of the present disclosure.
Figure 9B:
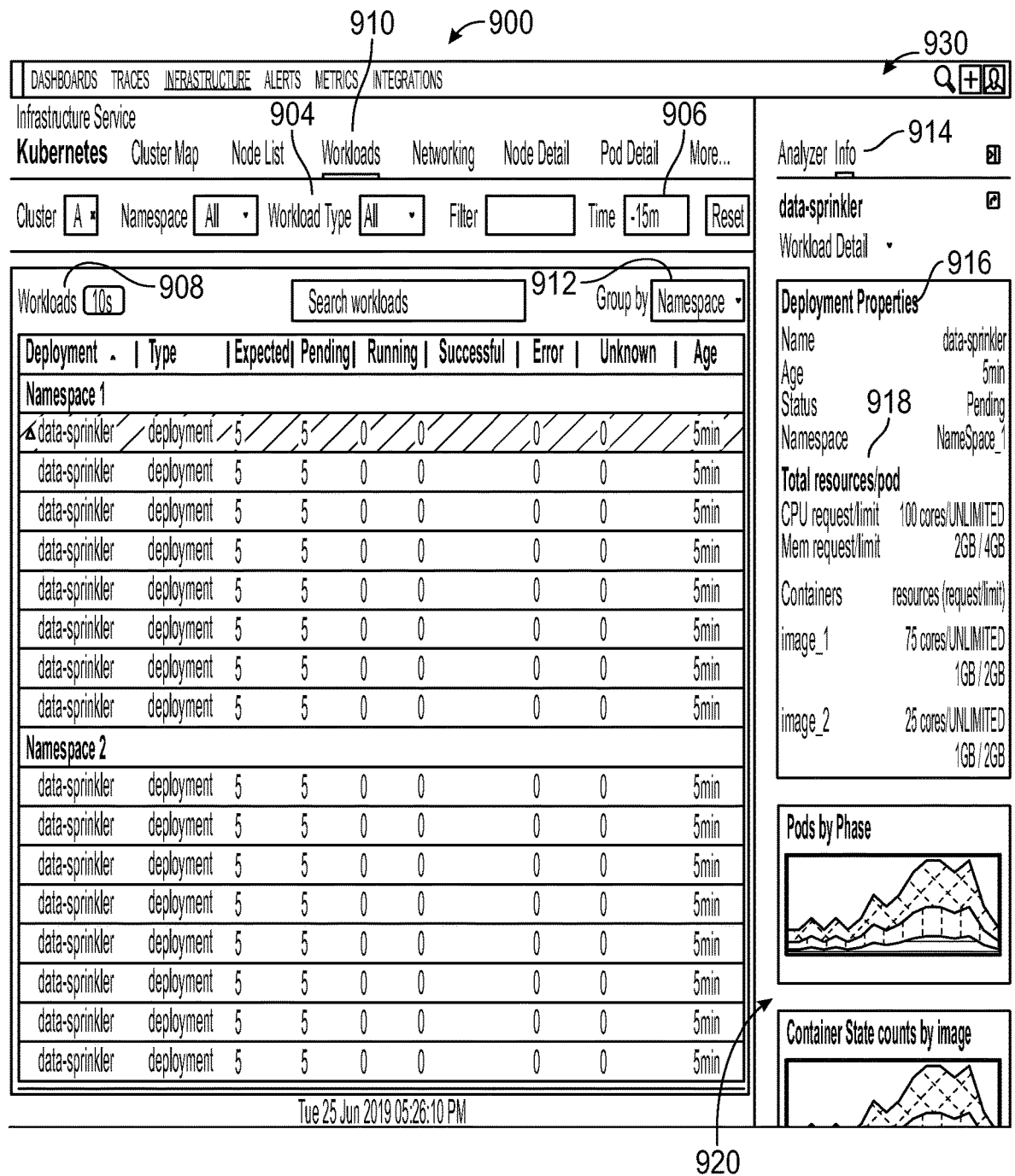

FIGS. 9A and 9B illustrate exemplary user interfaces 900 for navigating data structures of a container orchestrator based on workloads, according to an embodiment of the present disclosure. In an implementation, information from the side panel 630 may be expanded. For example, FIGS. 9A and 9B show an expanded view 900 of the workload information 718 of FIG. 7A. The expanded view 900 may also be access through the workloads tab 910.

As shown, the expanded view 900 provides additional granular information for the deployment: "data-sprinkler," including deployment namespace, type, expected, pending, running, successful, error, unknown, and age. According to aspects, a workload type 904 may be filtered based on various criteria, including, but not limited to, Deployments, StatefulSets, Cronjobs, DaemonSets, and ReplicaSets.

According to embodiments, the analyzer 902 may display failed pods and pending pods, along with the nodes that include those pods. The workloads may also be grouped by namespace, or any other grouping 912 to highlight patterns. An elapsed time 906 (e.g., −15 m) and a workload time 908 may also be specified to narrow a range of the workloads.

Referring to FIG. 9B, a side panel 930 of the interface 900 may display information 914 regarding the workload. For example, a workload detail for "data-sprinkler" may include deployment properties 916, total resources consumed 918, and graphical details 920, similar to the above in FIG. 7C. In this way, a user may similarly identify and debug "data-sprinkler" as a root cause of an error.

Figure 10B:
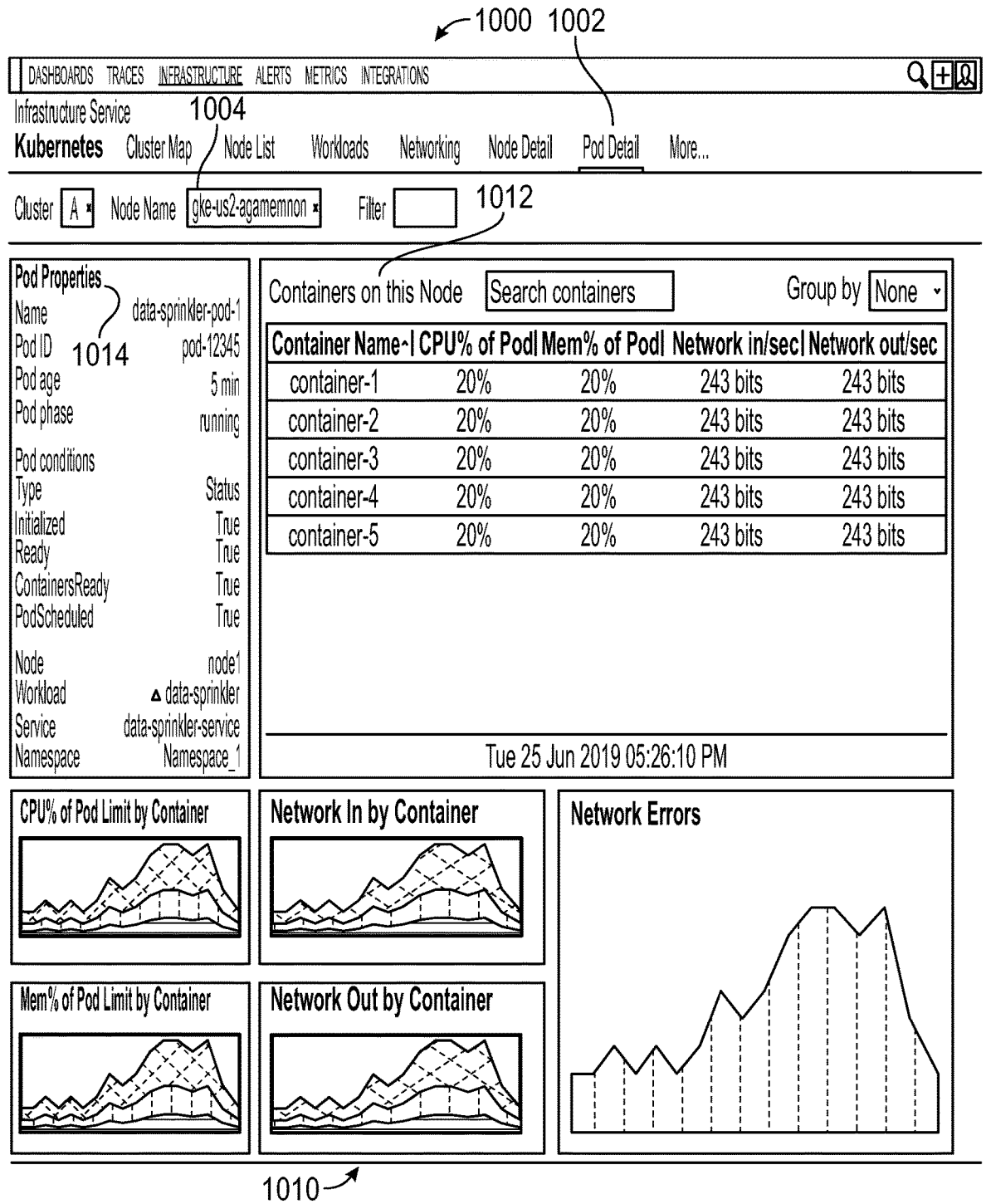
Figure 10C:
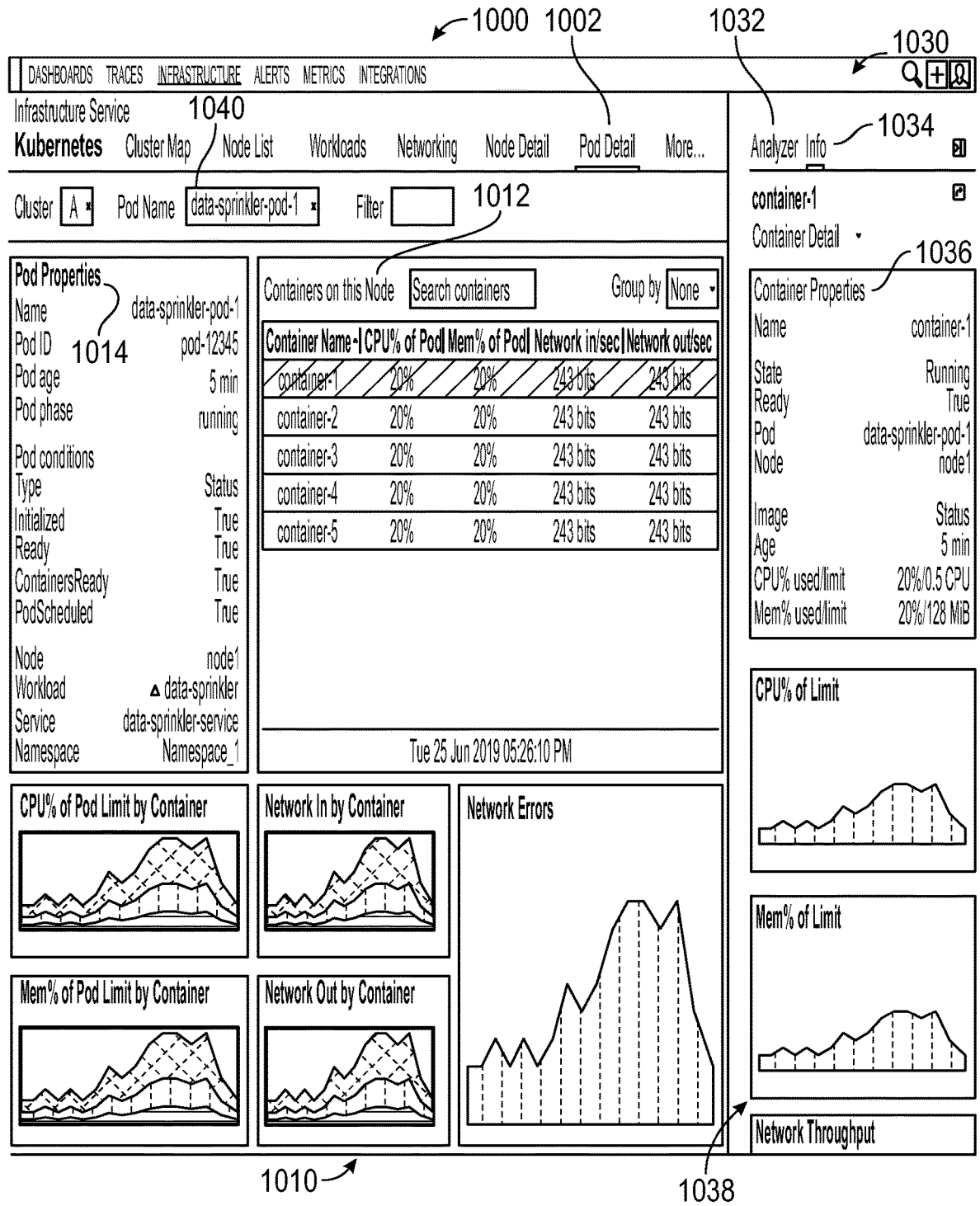

FIGS. 10A-10C illustrate additional exemplary user interfaces 1000 for navigating data structures of a container orchestrator, according to an embodiment of the present disclosure. Referring to FIG. 10A, a user interface 1000 may include pod details 1002. For example, the node details 1002 may include expanded information from a side panel. As illustrated, a node name 1004 may be displayed, along with node workloads 1006, node properties 1008, graphical pod data 1010, and containers on the node 1012.

According to aspects, the node properties 1008 may include name, ID, condition, taints, labels, and uptime, among others. The workloads 1006 may include workload name, workload type, namespace, and number of pods on the node. The graphical pod data 1010 may include CPU % by pod, memory % by pod, network in by pod, network out by pod, etc. The containers 1012 may include container name, pod name, workload name, namespace, CPU % of node capacity, network in/sec, network out/sec, etc.

FIG. 10B illustrates that the user interface 1000 may include pod details 1002 such as pod properties 1014, in addition to the node name 1004, containers on the node 1012, and graphical pod data 1010.

According to aspects, the pod properties 1014 may include name, pod ID, pod age, pod phase, pod conditions, type, initialized status, ready status, containers ready status, pod scheduled status, node, workload, service, and namespace, among others. The graphical pod data 1010 may include CPU % of pod limit by container, memory % of pod limit by container, network in by container, network out by container, network errors, etc.

FIG. 10C illustrates a side panel 1030 having an analyzer 1032 and information 1034 regarding the pod 1040. For example, the information 1034 may include container properties 1036 and graphical data 1038.

According to aspects, the container properties 1036 may include name, state, ready status, pod, node, image, age, CPU % used/limit, memory % used/limit, etc.

Process for Navigating Data Structures

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 11:
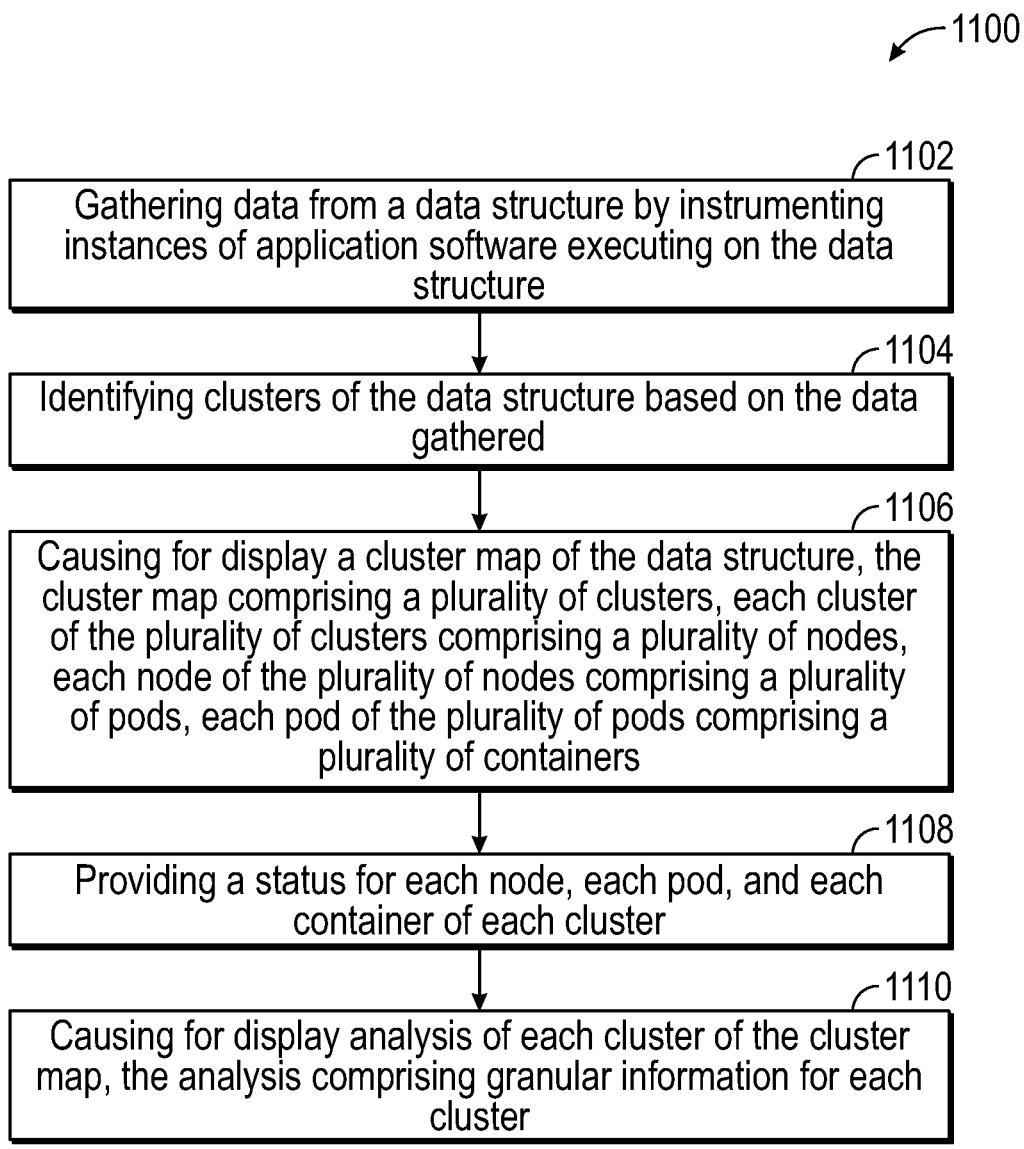
FIG. 11 is a flow diagram illustrative of an embodiment of a process for navigating clusters of a data structure, according to embodiments of the present disclosure.

FIG. 11 is a flow diagram illustrative of an embodiment of a process 1100 for navigating clusters of a data structure, according to embodiments of the disclosure. For explanatory purposes, the steps of the example process 1100 are described herein as occurring in serial, or linearly. However, multiple instances of the example process 1100 may occur in parallel, and/or the various steps may be performed concurrently and/or in a different order or sequence than is described herein.

At step 1102, data is gathered from a data structure by instrumenting instances of application software executing on the data structure. At step 1104, clusters of the data structure are identified based on the gathered data. At step 1106, a cluster map of the data structure is displayed. The cluster map may include multiple clusters. Each cluster may include multiple nodes. Each node may include multiple pods. Each pod may include multiple containers. At step 1108, a status is provided for each node, each pod, and each container of each cluster. At step 1110, analysis of each cluster of the cluster map is displayed. The analysis may include granular information for each cluster.

According to aspects, step 1102 may include gathering data (e.g., data 302) from a data structure by instrumenting instances of application software executing on the data structure. At step 1104, clusters (e.g., cluster 602a) of the data structure are identified based on the data gathered. At step 1106, a cluster map (e.g., cluster map 614b) of the data structure is displayed. The cluster map may include multiple clusters. Each cluster may include multiple nodes (e.g., nodes 604). Each node may include multiple pods (e.g., pod 702). Each pod may include multiple containers (e.g., container 704). At step 1108, a status (e.g., status 606), is provided for each node, each pod, and each container of each cluster. At step 1110, analysis (e.g., through analyzer 632) of each cluster of the cluster map is displayed. The analysis may include granular information for each cluster.

According to embodiments, the status comprises good health, moderate health, or bad health, and is based on a color code. The color code may include at least a first color for indicating good health, a second color for indicating moderate health, and a third color for indicating bad health.

According to embodiments, the process 1100 further includes causing display of a list of suggested filters based on the status, wherein the filtering is based on at least one of the suggested filters.

According to embodiments, the process 1100 further includes filtering the clusters based on the status to obtain items of interest, each of the items of interest comprising either a node, a pod, or a container, wherein the filtering is based on defined conditions comprising thresholds.

According to embodiments, the process 1100 further includes diagnosing an item of interest, causing display of diagnostic information relating to the item of interest, and identifying a specific deployment instance of the item of interest that is causing the status.

According to embodiments, the status for a node comprises either moderate health or bad health and an item of interest comprises a pod. According to embodiments, the status for a pod comprises moderate health or bad health and an item of interest comprises a container.

According to embodiments, the process 1100 further includes causing display of each cluster of the plurality of clusters. According to embodiments, the process 1100 further includes causing display of each node of the plurality of nodes.

According to embodiments, the process 1100 further includes causing display of each pod of the plurality of pods. According to embodiments, the process 1100 further includes causing display of each container of the plurality of containers.

According to embodiments, the process 1100 further includes defining conditions that affect execution of the instances of the application software, and causing display of the status for each node, each pod, and each container of each cluster based on the defined conditions. According to embodiments, the process 1100 further includes isolating an item of interest based on filtering the clusters.

What is claimed is:

1. A computer-implemented method for navigating clusters of a data structure, the method comprising:
    gathering data from the data structure by instrumenting instances of application software executing on the data structure, the gathered data comprising metadata generated by the instrumented software;
    identifying clusters of the data structure based on the gathered data;
    causing display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers;
    providing a status for each node, each pod, and each container of each cluster, the status comprising an outline around each cluster, wherein the outline is based on a color code comprising at least a first color for indicating good health, a second color for indicating moderate health, and a third color for indicating bad health;
    causing display of analysis of each cluster of the cluster map, the analysis comprising granular information for each cluster;
    isolating an item of interest based on filtering the clusters by comparing nodes running a deployment to nodes not running the deployment, the item of interest comprising a deployment having a potential source of errors, the potential source of errors comprising at least one of over-represented CPU nodes, over-represented memory nodes, and/or over-represented not-ready nodes;
    diagnosing the item of interest, wherein diagnosis is based on a container-to-service correlation; and
    causing display of the item of interest comprising the deployment as an interactive link, wherein additional information is provided upon interacting with the interactive link, the additional information relating to at least an alert for the deployment.

2. The computer-implemented method of claim 1, wherein the status comprises good health, moderate health, or bad health.

3. The computer-implemented method of claim 1, further comprising:
    causing display of a list of suggested filters based on the status, wherein filtering is based on at least one of the suggested filters.

4. The computer-implemented method of claim 1, further comprising:
    filtering the clusters based on the status to obtain items of interest, each of the items of interest comprising either a node, a pod, or a container, wherein the filtering is based on defined conditions comprising thresholds.

5. The computer-implemented method of claim 1, further comprising:
    causing display of diagnostic information relating to the item of interest; and
    identifying a specific deployment instance of the item of interest that is causing the status.

6. The computer-implemented method of claim 1, wherein the status for a node comprises either moderate health or bad health and the item of interest comprises a pod.

7. The computer-implemented method of claim 1, wherein the status for a pod comprises moderate health or bad health and the item of interest comprises a container.

8. The computer-implemented method of claim 1, further comprising:
    causing display of each cluster of the plurality of clusters.

9. The computer-implemented method of claim 1, further comprising:
    causing display of each node of the plurality of nodes.

10. The computer-implemented method of claim 1, further comprising:
    causing display of each pod of the plurality of pods.

11. The computer-implemented method of claim 1, further comprising:
    causing display of each container of the plurality of containers.

12. The computer-implemented method of claim 1, further comprising:
    defining conditions that affect execution of the instances of the application software; and
    causing display of the status for each node, each pod, and each container of each cluster based on the defined conditions.

13. The computer-implemented method of claim 1, further comprising:
    identifying a specific cause of errors based on the potential source of errors.

14. A system for navigating clusters of a data structure, the system comprising:
    at least one memory having instructions stored thereon; and
    at least one processor configured to execute the instructions, wherein the at least one processor is configured to:
    gather data from the data structure by instrumenting instances of application software executing on the data structure, the gathered data comprising metadata generated by the instrumented software;
    identify clusters of the data structure based on the gathered data;

cause display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers;

provide a status for each node, each pod, and each container of each cluster, the status comprising an outline around each cluster, wherein the outline is based on a color code comprising at least a first color for indicating good health, a second color for indicating moderate health, and a third color for indicating bad health;

cause display of analysis of each cluster of the cluster map, the analysis comprising granular information for each cluster;

isolate an item of interest based on filtering the clusters by comparing nodes running a deployment to nodes not running the deployment, the item of interest comprising a deployment having a potential source of errors, the potential source of errors comprising at least one of over-represented CPU nodes, over-represented memory nodes, and/or over-represented not-ready nodes;

diagnose the item of interest, wherein diagnostic information is based on a container-to-service correlation; and cause display of the item of interest comprising the deployment as an interactive link, wherein additional information is provided upon interacting with the interactive link, the additional information relating to at least an alert for the deployment.

15. The system of claim 14, wherein the status comprises good health, moderate health, or bad health.

16. The system of claim 14, wherein the processor is further configured to:
cause display of a list of suggested filters based on the status, wherein filtering is based on at least one of the suggested filters.

17. The system of claim 14, wherein the processor is further configured to:
filter the clusters based on the status to obtain items of interest, each of the items of interest comprising either a node, a pod, or a container, wherein the filter is based on defined conditions comprising thresholds.

18. The system of claim 14, wherein the processor is further configured to:
cause display of the diagnostic information relating to the item of interest; and
identify a specific deployment instance of the item of interest that is causing the status.

19. The system of claim 14, wherein the status for a node comprises either moderate health or bad health and an item of interest comprises a pod.

20. A non-transitory computer-readable storage medium comprising instructions stored thereon, which when executed by one or more processors, cause the one or more processors to perform operations for navigating clusters of a data structure, the operations comprising:

gathering data from the data structure by instrumenting instances of application software executing on the data structure, the gathered data comprising metadata generated by the instrumented software;

identifying clusters of the data structure based on the data gathered;

causing display of a cluster map of the data structure, the cluster map comprising a plurality of clusters, each cluster of the plurality of clusters comprising a plurality of nodes, each node of the plurality of nodes comprising a plurality of pods, each pod of the plurality of pods comprising a plurality of containers;

providing a status for each node, each pod, and each container of each cluster, the status comprising an outline around each cluster, wherein the outline is based on a color code comprising at least a first color for indicating good health, a second color for indicating moderate health, and a third color for indicating bad health;

causing display of analysis of each cluster of the cluster map, the analysis comprising granular information for each cluster;

isolating an item of interest based on filtering the clusters by comparing nodes running a deployment to nodes not running the deployment, the item of interest comprising a deployment having a potential source of errors, the potential source of errors comprising at least one of over-represented CPU nodes, over-represented memory nodes, and/or over-represented not-ready nodes;

diagnosing the item of interest, wherein diagnostic information is based on a container-to-service correlation; and causing display of the item of interest comprising the deployment as an interactive link, wherein additional information is provided upon interacting with the interactive link, the additional information relating to at least an alert for the deployment.

\* \* \* \* \*